US012795547B2

(12) United States Patent
Liu et al.

(10) Patent No.: US 12,795,547 B2
(45) Date of Patent: Nov. 10, 2026

(54) MEASURING CHANNEL STATE FEEDBACK USING FREQUENCY MODULATED CONTINUOUS WAVE-BASED LOW-POWER REFERENCE SIGNALS

(71) Applicant: QUALCOMM Incorporated, San Diego, CA (US)

(72) Inventors: Kangqi Liu, San Diego, CA (US); Weimin Duan, San Diego, CA (US); Hyojin Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 287 days.

(21) Appl. No.: 18/605,712

(22) Filed: Mar. 14, 2024

(65) Prior Publication Data

US 2025/0294457 A1 Sep. 18, 2025

(51) Int. Cl.

| | |
|---|---|
| ***H04W 52/02*** | (2009.01) |
| ***H04B 7/06*** | (2006.01) |
| ***H04W 8/22*** | (2009.01) |
| ***H04W 76/20*** | (2018.01) |

(52) U.S. Cl.

CPC ...... *H04W 52/0235* (2013.01); *H04B 7/0626* (2013.01); *H04W 8/22* (2013.01); *H04W 76/20* (2018.02)

(58) Field of Classification Search

CPC ... H04W 52/0235; H04W 8/22; H04W 76/20; H04W 52/028; H04B 7/0626; Y02D 30/70

See application file for complete search history.

(56) References Cited

U.S. PATENT DOCUMENTS

| | | | | |
|---|---|---|---|---|
| 12,238,543 | B2 * | 2/2025 | Wu | H04W 24/02 |
| 2020/0045635 | A1 | 2/2020 | Lin et al. | |
| 2020/0221384 | A1 * | 7/2020 | Ang | H04W 52/0229 |
| 2021/0185611 | A1 * | 6/2021 | Ljung | H04W 52/0235 |
| 2023/0350045 | A1 * | 11/2023 | Yerramalli | G01S 13/536 |

(Continued)

OTHER PUBLICATIONS

Physical Layer Signals and Procedure for Low-Power WUS, CATT, 3GPP, 2023 (Year: 2023).*

(Continued)

*Primary Examiner* — Habte Mered

(74) *Attorney, Agent, or Firm* — Holland & Hart LLP / Qualcomm

(57) ABSTRACT

Methods, systems, and devices for wireless communications are described. The described techniques may enable a user equipment (UE) to receive one or more frequency modulated continuous wave (FMCW)-based low power reference signals (LP-RSs) via a low power wake-up radio (LP-WUR), which may allow the UE to provide accurate channel state feedback (CSF) using the LP-WUR (e.g., without entering an active mode or waking up other components of the UE). In some aspects, the UE may measure an FMCW-based LP-RS via a narrow bandwidth and may use the frequency modulation properties of the FMCW-based LP-RS to estimate a wideband channel and report wideband CSF. In some examples, the UE may receive both a low power wake-up signal (LP-WUS) and an FMCW-based LP-RS via the LP-WUR. In some examples, the UE may receive an FMCW-based LP-RS that indicates wake-up information (e.g., in lieu of the LP-WUS).

30 Claims, 19 Drawing Sheets

(56) References Cited

U.S. PATENT DOCUMENTS

| | | | | |
|---|---|---|---|---|
| 2023/0370968 | A1* | 11/2023 | Elshafie | H04W 76/27 |
| 2024/0155491 | A1* | 5/2024 | Cheng | H04W 52/0229 |
| 2025/0261115 | A1* | 8/2025 | Mazloum | H04W 52/0235 |
| 2025/0358742 | A1* | 11/2025 | Xue | H04W 76/28 |
| 2026/0040224 | A1* | 2/2026 | Yang | H04W 52/0235 |

OTHER PUBLICATIONS

International Search Report and Written Opinion—PCT/US2025/013183—ISA/EPO—Apr. 17, 2025.

* cited by examiner

MEASURING CHANNEL STATE FEEDBACK USING FREQUENCY MODULATED CONTINUOUS WAVE-BASED LOW-POWER REFERENCE SIGNALS

TECHNICAL FIELD

The following relates to wireless communications, including measuring channel state feedback (CSF) using frequency modulated continuous wave (FMCW)-based low-power reference signals (LP-RSs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipments (UEs).

SUMMARY

The described techniques relate to improved methods, systems, devices, and apparatuses that support measuring channel state feedback (CSF) using frequency modulated continuous wave (FMCW)-based low-power reference signals (LP-RSs). For example, the described techniques may enable a user equipment (UE) to receive one or more FMCW-based LP-RSs via a low power wake-up radio (LP-WUR), which may allow or otherwise enable the UE to provide accurate CSF using the LP-WUR (e.g., without entering an active mode or otherwise waking up one or more other components of the UE). The UE may measure an FMCW-based LP-RS via a narrow bandwidth and may use the frequency modulation properties of the FMCW-based LP-RS to estimate a wideband channel and report wideband CSF. In some examples, the UE may receive both a low power wake-up signal (LP-WUS) and an FMCW-based LP-RS via the LP-WUR. In some examples, the UE may receive an FMCW-based LP-RS that may indicate information (e.g., wake-up or sleep indications) in lieu of the LP-WUS.

A method for wireless communications by a UE is described. The method may include receiving, at a LP-WUR of the UE, a FMCW-based LP-RS via a first bandwidth associated with a baseband processing capability of the LP-WUR and transmitting, based on receiving the FMCW-based LP-RS via the first bandwidth, a channel state information (CSI) report including CSF associated with a second bandwidth, where the second bandwidth includes the first bandwidth.

A UE for wireless communications is described. The UE may include one or more memories storing processor executable code, and one or more processors coupled with (e.g., operatively, communicatively, functionally, electronically, or electrically) the one or more memories. The one or more processors may individually or collectively be operable to execute the code (e.g., directly, indirectly, after pre-processing, or without pre-processing) to cause the UE to receive, at a LP-WUR of the UE, a FMCW-based LP-RS via a first bandwidth associated with a baseband processing capability of the LP-WUR and transmit, based on receiving the FMCW-based LP-RS via the first bandwidth, a CSI report including CSF associated with a second bandwidth, where the second bandwidth includes the first bandwidth.

Another UE for wireless communications is described. The UE may include means for receiving, at a LP-WUR of the UE, a FMCW-based LP-RS via a first bandwidth associated with a baseband processing capability of the LP-WUR and means for transmitting, based on receiving the FMCW-based LP-RS via the first bandwidth, a CSI report including CSF associated with a second bandwidth, where the second bandwidth includes the first bandwidth.

A non-transitory computer-readable medium storing code for wireless communications is described. The code may include instructions executable by one or more processors (e.g., directly, indirectly, after pre-processing, or without pre-processing) to receive, at a LP-WUR of the UE, a FMCW-based LP-RS via a first bandwidth associated with a baseband processing capability of the LP-WUR and transmit, based on receiving the FMCW-based LP-RS via the first bandwidth, a CSI report including CSF associated with a second bandwidth, where the second bandwidth includes the first bandwidth.

Some examples of the method, UEs, and non-transitory computer-readable medium described herein may further include operations, features, means, or instructions for receiving, at the LP-WUR, a LP-WUS indicating for the UE to monitor for the FMCW-based LP-RS.

In some examples of the method, UEs, and non-transitory computer-readable medium described herein, the LP-WUS includes an indication of a first resource allocation for the FMCW-based LP-RS and receiving the FMCW-based LP-RS may be based on the first resource allocation.

Some examples of the method, UEs, and non-transitory computer-readable medium described herein may further include operations, features, means, or instructions for receiving a control signal that indicates a set of multiple resource allocations including the first resource allocation for the FMCW-based LP-RS, where the indication includes an index, from a set of multiple indices corresponding to the set of multiple resource allocations, corresponding to the first resource allocation of the set of multiple resource allocations.

Some examples of the method, UEs, and non-transitory computer-readable medium described herein may further include operations, features, means, or instructions for receiving a control signal that indicates a set of multiple resource allocation offsets between the first resource allocation for the FMCW-based LP-RS and a second resource allocation for the LP-WUS, where the indication includes an index, from a set of multiple indices corresponding to the set of multiple resource allocation offsets, corresponding to a first resource allocation offset of the set of multiple resource allocation offsets, where the first resource allocation may be offset from the second resource allocation by the first resource allocation offset.

Some examples of the method, UEs, and non-transitory computer-readable medium described herein may further include operations, features, means, or instructions for receiving a control signal that indicates a resource allocation offset between a first resource allocation for the FMCW-based LP-RS and a second resource allocation for the LP-WUS, where receiving the FMCW-based LP-RS may be based on the resource allocation offset.

In some examples of the method, UEs, and non-transitory computer-readable medium described herein, receiving the FMCW-based LP-RS may include operations, features, means, or instructions for receiving wake-up information via the FMCW-based LP-RS.

In some examples of the method, UEs, and non-transitory computer-readable medium described herein, the FMCW-based LP-RS indicates the wake-up information via a slope of the FMCW-based LP-RS, via an orthogonal cover code (OCC) associated with the FMCW-based LP-RS, via a cyclic shift associated with the FMCW-based LP-RS, via a triangular chirp associated with the FMCW-based LP-RS, or any combination thereof.

Some examples of the method, UEs, and non-transitory computer-readable medium described herein may further include operations, features, means, or instructions for receiving a control signal that indicates a shared resource allocation for first CSI reports associated with the LP-WUR and second CSI reports associated with a main radio of the UE.

Some examples of the method, UEs, and non-transitory computer-readable medium described herein may further include operations, features, means, or instructions for receiving a control signal that indicates a first resource allocation for first CSI reports associated with the LP-WUR and a second resource allocation for second CSI reports associated with a main radio of the UE.

Some examples of the method, UEs, and non-transitory computer-readable medium described herein may further include operations, features, means, or instructions for transmitting a capability report including an indication of a capability of the LP-WUR to perform FMCW-based wideband channel estimation.

In some examples of the method, UEs, and non-transitory computer-readable medium described herein, the capability report indicates one or more of a FMCW-based channel estimation bandwidth supported by the LP-WUR, a granularity of wideband channel estimation supported by the LP-WUR, a quantity of subbands for channel estimation supported by the LP-WUR, a timing gap between a reception time associated with the FMCW-based LP-RS and a transmission time associated with the CSI report, or any combination thereof.

Some examples of the method, UEs, and non-transitory computer-readable medium described herein may further include operations, features, means, or instructions for receiving a low-power signal indicating for the UE to transition from a radio resource control (RRC) idle or inactive state to a RRC connected state, where the RRC idle or inactive state may be a state in which the LP-WUR may be powered on and a main radio of the UE may be powered off.

In some examples of the method, UEs, and non-transitory computer-readable medium described herein, transmitting the CSI report may include operations, features, means, or instructions for transmitting the CSI report via a message of a random access channel (RACH) procedure.

Some examples of the method, UEs, and non-transitory computer-readable medium described herein may further include operations, features, means, or instructions for selecting a RACH occasion associated with the RACH procedure based on the CSI report being based on the FMCW-based LP-RS.

Some examples of the method, UEs, and non-transitory computer-readable medium described herein may further include operations, features, means, or instructions for receiving, in accordance with transmitting the message, a second message of the RACH procedure including a resource grant for one or more messages, where the resource grant may be based on the CSI report.

Some examples of the method, UEs, and non-transitory computer-readable medium described herein may further include operations, features, means, or instructions for performing bistatic sensing based on receiving the FMCW-based LP-RS via the LP-WUR.

Some examples of the method, UEs, and non-transitory computer-readable medium described herein may further include operations, features, means, or instructions for transmitting a capability report indicating a capability of the UE to perform, using the LP-WUR, bistatic sensing associated with reception of FMCW-based LP-RSs, where performing the bistatic sensing may be based on the capability.

In some examples of the method, UEs, and non-transitory computer-readable medium described herein, the baseband processing capability of the LP-WUR may be a narrowband baseband processing capability.

A method for wireless communications by a network entity is described. The method may include obtaining, from a UE, a capability report including an indication of a capability of a LP-WUR of the UE to perform FMCW-based wideband channel estimation, outputting, in accordance with the capability of the LP-WUR of the UE, a FMCW-based LP-RS, and obtaining, based on outputting the FMCW-based LP-RS, a CSI report including CSF.

A network entity for wireless communications is described. The network entity may include one or more memories storing processor executable code, and one or more processors coupled with (e.g., operatively, communicatively, functionally, electronically, or electrically) the one or more memories. The one or more processors may individually or collectively be operable to execute the code (e.g., directly, indirectly, after pre-processing, or without pre-processing) to cause the network entity to obtain, from a UE, a capability report including an indication of a capability of a LP-WUR of the UE to perform FMCW-based wideband channel estimation, output, in accordance with the capability of the LP-WUR of the UE, a FMCW-based LP-RS, and obtain, based on outputting the FMCW-based LP-RS, a CSI report including CSF.

Another network entity for wireless communications is described. The network entity may include means for obtaining, from a UE, a capability report including an indication of a capability of a LP-WUR of the UE to perform FMCW-based wideband channel estimation, means for outputting, in accordance with the capability of the LP-WUR of the UE, a FMCW-based LP-RS, and means for obtaining, based on outputting the FMCW-based LP-RS, a CSI report including CSF.

A non-transitory computer-readable medium storing code for wireless communications is described. The code may include instructions executable by one or more processors (e.g., directly, indirectly, after pre-processing, or without pre-processing) to obtain, from a UE, a capability report including an indication of a capability of a LP-WUR of the UE to perform FMCW-based wideband channel estimation, output, in accordance with the capability of the LP-WUR of the UE, a FMCW-based LP-RS, and obtain, based on outputting the FMCW-based LP-RS, a CSI report including CSF.

Some examples of the method, network entities, and non-transitory computer-readable medium described herein may further include operations, features, means, or instructions for outputting a LP-WUS indicating for the UE to monitor for the FMCW-based LP-RS.

In some examples of the method, network entities, and non-transitory computer-readable medium described herein, the LP-WUS includes an indication of a first resource allocation for the FMCW-based LP-RS and outputting the FMCW-based LP-RS may be based on the first resource allocation.

Some examples of the method, network entities, and non-transitory computer-readable medium described herein may further include operations, features, means, or instructions for outputting a control signal that indicates a set of multiple resource allocations including the first resource allocation for the FMCW-based LP-RS, where the indication includes an index, from a set of multiple indices corresponding to the set of multiple resource allocations, corresponding to the first resource allocation of the set of multiple resource allocations.

Some examples of the method, network entities, and non-transitory computer-readable medium described herein may further include operations, features, means, or instructions for outputting a control signal that indicates a set of multiple resource allocation offsets between the first resource allocation for the FMCW-based LP-RS and a second resource allocation for the LP-WUS, where the indication includes an index, from a set of multiple indices corresponding to the set of multiple resource allocation offsets, corresponding to a first resource allocation offset of the set of multiple resource allocation offsets, where the first resource allocation may be offset from the second resource allocation by the first resource allocation offset.

Some examples of the method, network entities, and non-transitory computer-readable medium described herein may further include operations, features, means, or instructions for outputting a control signal that indicates a resource allocation offset between a first resource allocation for the FMCW-based LP-RS and a second resource allocation for the LP-WUS, where outputting the FMCW-based LP-RS may be based on the resource allocation offset.

In some examples of the method, network entities, and non-transitory computer-readable medium described herein, outputting the FMCW-based LP-RS may include operations, features, means, or instructions for outputting wake-up information via the FMCW-based LP-RS.

In some examples of the method, network entities, and non-transitory computer-readable medium described herein, the FMCW-based LP-RS indicates the wake-up information via a slope of the FMCW-based LP-RS, via an OCC associated with the FMCW-based LP-RS, via a cyclic shift associated with the FMCW-based LP-RS, via a triangular chirp associated with the FMCW-based LP-RS, or any combination thereof.

Some examples of the method, network entities, and non-transitory computer-readable medium described herein may further include operations, features, means, or instructions for outputting a control signal that indicates a shared resource allocation for first CSI reports associated with the LP-WUR and second CSI reports associated with a main radio of the UE.

Some examples of the method, network entities, and non-transitory computer-readable medium described herein may further include operations, features, means, or instructions for outputting a control signal that indicates a first resource allocation for first CSI reports associated with the LP-WUR and a second resource allocation for second CSI reports associated with a main radio of the UE.

In some examples of the method, network entities, and non-transitory computer-readable medium described herein, the capability report indicates one or more of a FMCW-based channel estimation bandwidth supported by the LP-WUR, a granularity of wideband channel estimation supported by the LP-WUR, a quantity of subbands for channel estimation supported by the LP-WUR, a timing gap between a reception time associated with the FMCW-based LP-RS and a transmission time associated with the CSI report, or any combination thereof.

Some examples of the method, network entities, and non-transitory computer-readable medium described herein may further include operations, features, means, or instructions for outputting a low-power signal indicating for the UE to transition from a RRC idle or inactive state to a RRC connected state, where the RRC idle or inactive state may be a state in which the LP-WUR may be powered on and a main radio of the UE may be powered off.

In some examples of the method, network entities, and non-transitory computer-readable medium described herein, obtaining the CSI report may include operations, features, means, or instructions for obtaining the CSI report via a message of a RACH procedure.

In some examples of the method, network entities, and non-transitory computer-readable medium described herein, a RACH occasion associated with the RACH procedure may be based on the CSI report being based on the FMCW-based LP-RS.

Some examples of the method, network entities, and non-transitory computer-readable medium described herein may further include operations, features, means, or instructions for outputting, in accordance with obtaining the message, a second message of the RACH procedure including a resource grant for one or more messages, where the resource grant may be based on the CSI report.

Some examples of the method, network entities, and non-transitory computer-readable medium described herein may further include operations, features, means, or instructions for obtaining, via the capability report, an indication of a capability of the UE to perform, using the LP-WUR, bistatic sensing associated with reception of FMCW-based LP-RSs.

In some examples of the method, network entities, and non-transitory computer-readable medium described herein, a baseband processing capability of the LP-WUR may be a narrowband baseband processing capability.

DETAILED DESCRIPTION

In some wireless communications systems, a user equipment (UE) may operate in a low power mode in which the UE (e.g., or at least one or more components of the UE, such as one or more relatively higher-power consuming components of the UE) may be inactive for a duration (e.g., a sleep duration). In some examples, the UE may use a low-power wake-up radio (LP-WUR) to receive one or more signals (e.g., low power wake-up signals (LP-WUSs)) from a network entity during such an inactive/sleep duration. For example, the LP-WUR may receive an LP-WUS indicating for the UE to enter an active mode (e.g., to wake up) to receive one or more signals via a main radio of the UE. The main radio of the UE may consume relatively more power than the LP-WUR of the UE. In some examples, the UE may wake up periodically to measure one or more channel state information (CSI) reference signals (CSI-RSs) via the main radio. In some cases, the UE may use the main radio to receive the CSI-RSs in accordance with the LP-WUR being bandwidth limited as compared to the main radio. In other words, the LP-WUR of the UE may receive signaling via a relatively narrower bandwidth than the main radio, and may therefore not accurately measure the CSI-RSs. The UE may measure CSI using the CSI-RSs received via the main radio and report channel state feedback (CSF). However, entering the active mode to measure the CSI-RSs may increase power consumption at the UE.

Accordingly, techniques described herein may enable the UE to receive one or more frequency modulated continuous wave (FMCW)-based low-power reference signals (LP-RSs) via the LP-WUR, which may allow or otherwise enable the UE to provide accurate CSF using the LP-WUR (e.g., despite the potentially limited capabilities of the LP-WUR). In some aspects, the UE may measure the one or more FMCW-based LP-RSs via a narrow bandwidth (e.g., based on a bandwidth via which the LP-WUR may be capable of measuring) and may use the frequency modulation properties of an FMCW-based LP-RS to estimate a wideband channel (e.g., and report wideband CSF). In some examples, the UE may receive both an LP-WUS and an FMCW-based LP-RS via the LP-WUR. In some other examples, the UE may receive an FMCW-based LP-RS that may indicate information (e.g., wake-up or sleep indications) in lieu of the LP-WUS. By performing CSI measurements via a relatively smaller bandwidth via the LP-WUR, the UE may report CSF with relatively less power consumption as compared to entering the active mode to perform the CSI measurements.

Aspects of the disclosure are initially described in the context of wireless communications systems. Aspects of the disclosure are further illustrated by and described with reference to timing diagrams, process flows, apparatus diagrams, system diagrams, and flowcharts that relate to measuring CSI and/or CSF using FMCW-based LP-RSs.

Figure 1:
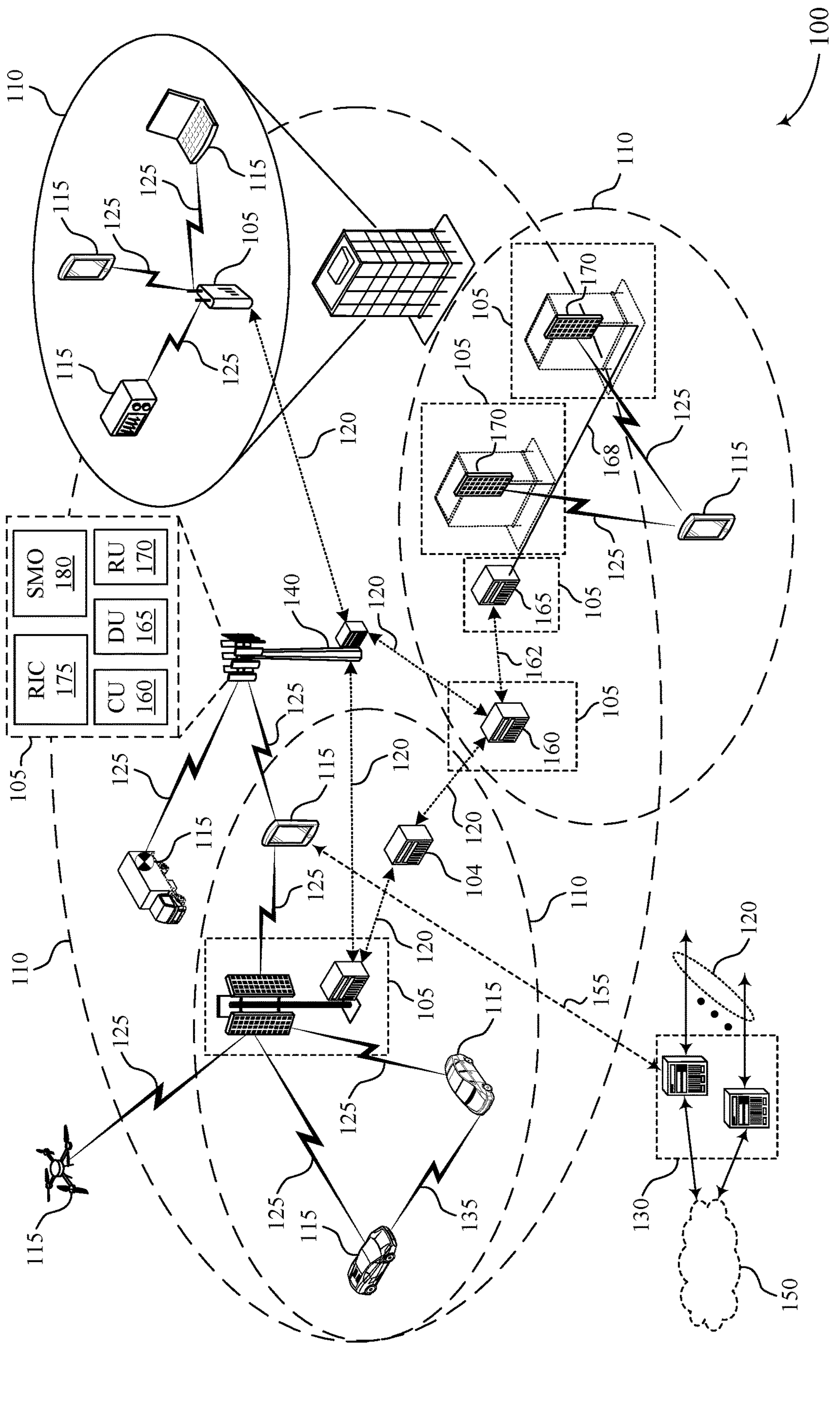
FIG. 1 shows an example of a wireless communications system that supports measuring channel state information (CSI) and/or channel state feedback (CSF) using frequency modulated continuous wave (FMCW)-based low-power reference signals (LP-RSs) in accordance with one or more aspects of the present disclosure.

FIG. 1 shows an example of a wireless communications system 100 that supports measuring CSI and/or CSF using FMCW-based LP-RSs in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein. Components within a wireless communication system may be coupled (for example, operatively, communicatively, functionally, electronically, and/or electrically) to each other.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100

(e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, or computing system may include disclosure of the UE 115, network entity 105, apparatus, device, or computing system being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., onc or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may cach be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further cMTC), and mMTC (massive MTC), and NB-IoT may include eNB-IoT (enhanced NB-IoT), and FeNB-IoT (further enhanced NB-IoT).

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link (s) 125 (e.g., one or more access links) using resources associated with one or more carriers. The term "carrier" may refer to a set of RF spectrum resources having a defined PHY layer structure for supporting the communication link (s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, a UE 115 may receive one or more FMCW-based LP-RSs from a network entity 105 via an LP-WUR of the UE 115. The UE 115 may accordingly provide CSF to the network entity 105 using the LP-WUR. The UE 115 may measure the FMCW-based LP-RSs via a relatively narrower bandwidth (e.g., based on a bandwidth via which the LP-WUR may be capable of measuring). The UE 115 may use the frequency modulation properties of the FMCW-based LP-RSs to estimate a wideband channel (e.g., a wider bandwidth than the relatively narrower bandwidth via which the LP-WUR may be capable of measuring) and to report wideband CSF.

In some examples, the UE 115 may receive both an LP-WUS and the FMCW-based LP-RSs via the LP-WUR from the network entity 105. For example, the LP-WUS may indicate for the UE 115 to monitor for the FMCW-based LP-RSs. In such examples, various implementations may be understood as a combination of WUS-triggered CSI-RS and FMCW-based CSI-RS. In some other examples, the UE 115 may receive an FMCW-based LP-RS that may indicate information (e.g., wake-up or sleep indications) in lieu of the LP-WUS. For example, the network entity 105 may indicate wake-up information via a slope of the FMCW-based LP-RS, via an orthogonal cover code (OCC) associated with the FMCW-based LP-RS, via a cyclic shift associated with the FMCW-based LP-RS, or via a triangular chirp associated with the FMCW-based LP-RS. In such examples, various implementations may be understood as a combination of WUS-based CSF and FMCW-based WUS.

Figure 2:
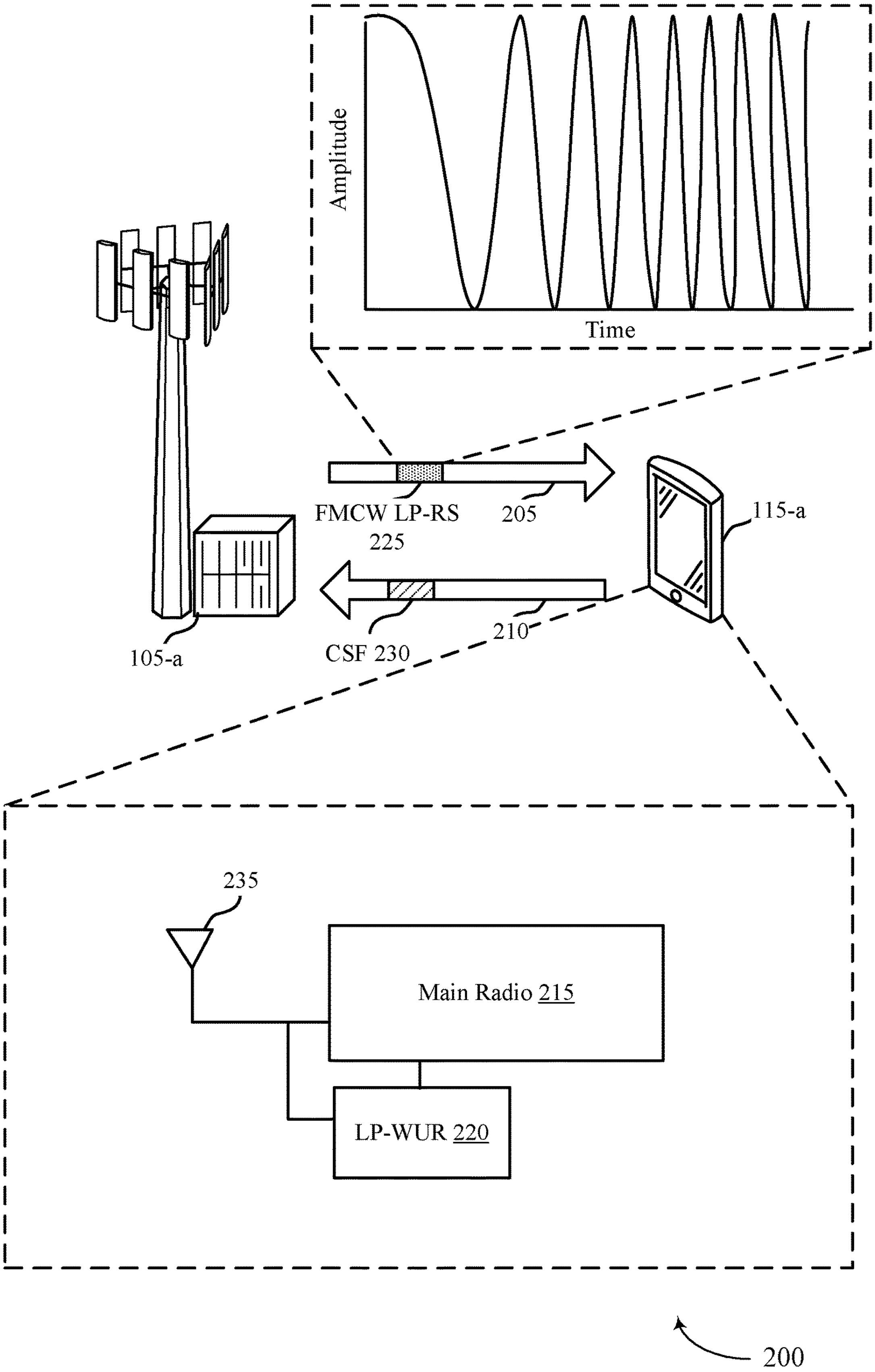
FIG. 2 shows an example of a signaling diagram that supports measuring CSI and/or CSF using FMCW-based LP-RSs in accordance with one or more aspects of the present disclosure.

FIG. 2 shows an example of a signaling diagram 200 that supports measuring CSI and/or CSF using FMCW-based LP-RSs in accordance with one or more aspects of the present disclosure. The signaling diagram 200 may implement or may be implemented by aspects of the wireless communications system 100. For example, the signaling diagram 200 may be implemented by a UE 115 (e.g., a UE 115-*a*) or a network entity 105 (e.g., a network entity 105-*a*), which may be examples of the corresponding devices as described with reference to FIG. 1.

In some examples of the signaling diagram 200, a UE 115-*a* may include a main radio 215 and an LP-WUR 220. The UE 115-*a* may use the main radio 215 for data communication (e.g., via an antenna 235). That is, when the UE 115-*a* is in an active state, the UE 115-*a* may transmit and receive messages from a network entity 105-*a* via the main radio 215. The main radio 215 may consume relatively more power than the LP-WUR 220. Accordingly, the UE 115-*a* may use the LP-WUR 220 as a companion receiver to monitor for wake-up signals (e.g., LP-WUSs) from the network entity 105-*a* when the UE 115-*a* is in a sleep state (e.g., a deep sleep state, a power saving mode, a low-power mode, or an idle mode). In some examples, the main radio 215 and the LP-WUR 220 may share (e.g., reuse) a same antenna 235, or may use separate antennas 235.

The LP-WUR 220 may consume relatively less power than the main radio 215 (e.g., and may be powered separately from the main radio 215) by including relatively fewer power-hungry components (e.g., blocks, such as processing units or processing blocks) than the main radio 215. Accordingly, by using the LP-WUR 220, the UE 115-*a* may reduce total power consumption by avoiding waking up (e.g., powering on) the main radio 215 to monitor for signals that the UE 115-*a* may instead receive via the LP-WUR 220 (e.g., LP-WUSs). For example, UE 115-*a* may enable or operate the LP-WUR 220 in an RRC connected state (e.g., without data communications) for power saving, which may allow or enable the network entity 105-*a* to transmit an LP-WUS rather than physical downlink control channel (PDCCH)-based wake-up signals (e.g., in a light traffic load scenario). Accordingly, the UE 115-*a* may enter a sleep state (e.g., a deep or light sleep mode with the main radio 215 of the UE 115-*a* turned off) and monitor for LP-WUSs (e.g., and/or low power synchronization signals (LP-SSs) or low-power reference signals (LP-RSs)) via the LP-WUR 220.

The UE 115-*a* and the network entity 105-*a* may communicate signaling over (such as via) one or more channels (e.g., an uplink channel, a downlink channel or a feedback channel). For example, the network entity 105-*a* may transmit downlink signaling to the UE 115 a via a downlink channel 205. The UE 115 a may transmit uplink signaling to the network entity 105-*a* via an uplink channel 210. In some examples, to improve a quality of communication (e.g., increase a signal-to-noise ratio (SNR)), the UE 115-*a* may perform channel estimation to determine (e.g., select, identify, measure, or otherwise ascertain) one or more communication parameters for the UE 115-*a* and the network entity 105-*a* to use. For example, the UE 115-*a* may determine CSI and report CSF 230 to the network entity 105-*a* to determine one or more communication parameters (e.g., a subspace of beams of a set of beams from a codebook, a BWP or frequency subband over which to communicate) to use for wireless communication over the downlink channel 205 and/or the uplink channel 210.

In some examples, to determine CSI and report CSF 230 to the network entity 105-*a*, the UE 115-*a* "wake up" the main radio 215 to measure CSI-RSs from the network entity 105-*a*. For example, the UE 115-*a* may be configured with resources (e.g., periodic resources) and may wake up and perform reference signal measurements for a CSI report via or otherwise using such configured resources. The UE 115-*a* may accordingly measure and report CSF 230 over a broad bandwidth (e.g., as opposed to a relatively narrower bandwidth monitored via the LP-WUR 220). However, such techniques may increase power consumption at the UE 115-*a* as a result of using the main radio 215 (e.g., rather than the LP-WUR 220). That is, by using the main radio 215 to perform channel estimation and report CSF, the UE 115-*a* may reduce a power saving gain (PSG) associated with using the LP-WUR 220. However, the LP-WUR 220 may have a relatively smaller (e.g., narrowband) baseband bandwidth than the main radio 215 (e.g., 5 to 10 megahertz (MHz)), and some CSI measurement techniques may involve monitoring a larger bandwidth (e.g., a wideband of 100 MHz or more than 400 MHz). That is, the UE 115-*a* may monitor a relatively smaller bandwidth using the LP-WUR 220 than using the main radio 215, which, in some systems, may result in inaccurate CSI measurements if the LP-WUR 220 is used to measure CSI-RSs or other reference signals due to the potential bandwidth limitation of the LP-WUR 220.

Accordingly, in some implementations, the network entity 105-*a* may transmit an FMCW-based LP-RS 225 to the UE 115-*a* via a narrowband bandwidth for the UE 115-*a* to measure CSI. The FMCW-based LP-RS 225 may be an "up-chirp" signal with a frequency that increases with time or a "down-chirp" signal with a frequency that decreases with time (e.g., linearly). Additionally, or alternatively, the FMCW-based LP-RS 225 may have a triangular chirp (e.g., with a frequency that first increases with time and then decreases with time, or vice-versa). The FMCW-based LP-RS 225 may be a time-domain signal (e.g., a function of time (t)). The UE 115-*a* may perform channel estimation of the downlink channel 205 (e.g., to determine CSI and transmit CSF 230 to the network entity 105-*a*) by receiving the FMCW-based LP-RS 225 from the network entity 105-*a* via the downlink channel 205 (e.g., an orthogonal frequency division multiplexing (OFDM) channel).

To perform channel estimation using the FMCW-based LP-RS 225, the UE 115-*a* may receive the FMCW-based LP-RS 225 (e.g., via a narrowband bandwidth in accordance with the narrowband baseband capability of the LP-WUR 220) and may use a set of FMCW parameters associated with the FMCW-based LP-RS 225 to generate a second (e.g., local) FMCW signal. The UE 115-*a* may combine the FMCW-based LP-RS 225 and the second FMCW signal and may filter the combined signal (e.g., using a low pass filter (LPF), or some other type of filter).

The UE 115-*a* may estimate the frequency domain channel by sampling the combined FMCW signal (e.g., sampling for performing an analog to digital conversion (ADC)) using a relatively low sampling rate. In some aspects, use of such a relatively low ADC rate may reduce complexity and power consumption associated with the FMCW signal. The sampling rate used by the receiving device may be based on one or more parameters of the downlink channel 205, such as a bandwidth or a subband frequency size of the downlink channel 205. In some examples, as the sampling rate decreases, a frequency domain resolution of the channel estimation may decrease. In some examples, a sampling rate used by the UE 115-*a* for FMCW-based channel estimation may be lower than (e.g., about 7% of) a sampling rate used by the UE 115-*a* for OFDM signal-based channel estimation.

The UE 115-*a* may perform channel estimation and determine wideband CSI for the downlink channel 205 by measuring the FMCW-based LP-RS 225 in a small (e.g., narrowband) baseband bandwidth (e.g., a bandwidth associated with a first BWP from a set of BWPs, where the set of BWPs are associated with the wideband). The UE 115-*a* may determine CSI with a relatively lower sampling rate and power consumption than some other channel estimation techniques. A mean square error (MSE) associated with the FMCW-based channel estimation may be relatively closer to an MSE for OFDM-based channel estimation for systems with relatively lower SNR (e.g., or if one or more edge tones are removed from the channel estimation) than for systems with a higher SNR (e.g., due to a distortion error).

In some examples, the UE 115-*a* may perform BWP selection to select one or more BWPs over which to communicate with the network entity 105-*a* based on the wideband channel estimation using the FMCW-based LP-RS 225. For example, the UE 115-*a* may estimate the downlink channel 205 over a set of BWPs (e.g., associated with the wideband, including the narrowband BWP over which the UE 115-*a* receives the FMCW-based LP-RS 225), such that the UE may select one or more second BWPs from the set of BWPs of the wideband based on the channel estimation procedure and transmit a report (e.g., the CSF 230) indicating the one or more second BWPs. The one or more second BWPs may be a set of BWPs with a relatively higher channel quality (e.g., decreased latency or decreased interference) as compared to one or more other BWPs of the wideband.

In some aspects, the UE 115-*a* may receive an LP-WUS via the LP-WUR 220 indicating for the UE 115-*a* to measure the FMCW-based LP-RS 225 (e.g., or for the UE 115-*a* to skip monitoring the FMCW-based LP-RS 225). The UE 115-*a* may measure the FMCW-based LP-RS 225 via the LP-WUR 220. Such techniques are described in further detail with reference to FIG. 3. In some aspects, the FMCW-based LP-RS 225 may enable low data rate communications for wake-up purposes. For example, the network entity 105-*a* may communicate wake-up information via the FMCW-based LP-RS 225. Such techniques are described in further detail with reference to FIG. 4.

In some aspects, the UE 115-*a* may report a capability to the network entity 105-*a* related to performing FMCW-based wideband channel estimation in the narrowband baseband using the LP-WUR 220. The UE 115-*a* may transmit the capability to the network entity 105-*a* via a capability report (e.g., an LP-WUR capability report). The LP-WUR capability report may, additionally, or alternatively, indicate a supported FMCW wideband bandwidth supported by the LP-WUR (e.g., a maximum wideband bandwidth that the UE 115-*a* may use the LP-WUR 220 to estimate), a granularity of the wideband channel estimation supported by the LP-WUR 220 (e.g., a maximum granularity in terms of, for example, resource blocks (RBs)), a quantity of subbands supported by the LP-WUR for a CSI report (e.g., a maximum quantity of subbands, such as in N3 5G CSI reports), or one or more other capabilities related to a baseband processing bandwidth of the LP-WUR 220 or an ADC sampling rate.

In some examples, the UE 115-*a* may transmit a report to the network entity 105-*a* indicating a timing gap (e.g., a minimum timing gap) between receiving the FMCW-based LP-RS 225 and transmitting the wideband CSI report (e.g., the CSF 230) based on the FMCW-based LP-RS 225. The network entity 105-*a* may schedule resources for receiving the FMCW-based LP-RS 225 and resources for transmitting CSF 230 in accordance with the reported timing gap.

In some aspects, the network entity 105-*a* may transmit low power signals to the LP-WUR 220 (e.g., when the UE 115-*a* is in an RRC idle or inactive sleep state). The low power signals may include an LP-WUS and/or the FMCW-based LP-RS 225. The low power signals may indicate for the UE 115-*a* to wake up and transition to an RRC connected state. In such examples, the RRC idle or inactive state may be a state in which the main radio 215 is off, and the RRC connected state may be a state in which the main radio 215 is on.

In some aspects, the UE 115-*a* may report the wideband CSI measured via the FMCW-based LP-RS 225 (e.g., transmit the CSF 230) via a message of a random access channel (RACH) procedure. For example, the UE 115-*a* may transmit the CSF 230 via a third message (e.g., msg3) of a four-step RACH procedure, or via a first message (e.g., msgA) of a two-step RACH procedure. A RACH opportunity selected by the UE 115-*a* for the RACH message may be based on the wideband CSI measured via the FMCW-based LP-RS 225. For example, the RACH opportunity may have an improved channel gain as compared to one or more other RACH opportunities based on the wideband CSI measured via the FMCW-based LP-RS 225. Another message of the RACH procedure (e.g., msg4 of the four-step RACH procedure or msgB of the two-step RACH procedure) may include a subsequent downlink or uplink grant for latency reduction (e.g., based on the wideband CSI measured via the FMCW-based LP-RS 225).

In some aspects, the network entity 105-*a* may indicate for the UE 115-*a* to perform bistatic sensing via the LP-WUR 220 in addition to or instead of measuring CSI via the FMCW-based LP-RS 225 using the LP-WUR 220. The bistatic sensing may be performed by a transmitter (e.g., the network entity 105-*a*) and a receiver (e.g., the LP-WUR 220 of the UE 115-*a*) different from the transmitter and separated by some distance (e.g., such that the transmitter and the receiver are not co-located). For example, the transmitting device may transmit a waveform (e.g., an FMCW-based signal) that is reflected off of one or more target objects. The receiving device may receive the waveform and detect the target objects. The UE 115-*a* may transmit the LP-WUR capability report including a capability of the LP-WUR 220 to perform bistatic sensing. The network entity 105-*a* may accordingly indicate the LP-WUR 220 to perform bistatic sensing (e.g., indicate the UE 115-*a* to perform bistatic sensing using the LP-WUR 220) based on the capability.

In some examples, one or more uplink resources (e.g., configured or allocated by the network entity 105-*a*) for the UE 115-*a* to transmit the CSF 230 to the network entity 105-*a* may be common across the main radio 215 and the LP-WUR 220. Additionally, or alternatively, the network entity 105-*a* may separately configure or allocate uplink resources for each of the main radio 215 and the LP-WUR 220 (e.g., via RRC). For example, the UE 115-*a* may receive a first configuration or allocation (e.g., a first information element or a first parameter of an information element)

indicating a first set of time and/or frequency resources associated with (such as for conveying) CSI measured via the LP-WUR 220 and may receive a second configuration or allocation (e.g., a second information element or a second parameter of an information element) indicating a second set of time and/or frequency resources associated with (such as for conveying) CSI measured via the main radio 215. In such examples, the uplink resources for the LP-WUR 220 may have a different (e.g., longer) periodicity than the uplink resources for the main radio 215. The UE 115-*a* may transmit the CSF 230 for the FMCW-based LP-RS 225 using the LP-WUR 220 (e.g., or using the main radio 215), and CSF 230 for one or more CSI-RSs using the main radio 215 via the shared or separate uplink CSF resources. The UE 115-*a* may skip the shared or separate CSF resources if the UE 115-*a* receives a low-power signal (e.g., the FMCW-based LP-RS 225, an LP-WUS, or one or more other low-power signals) indicating for the UE 115-*a* to go to sleep or to remain in a sleep state. Such techniques may reduce power consumption at the UE 115-*a*.

Figure 3:
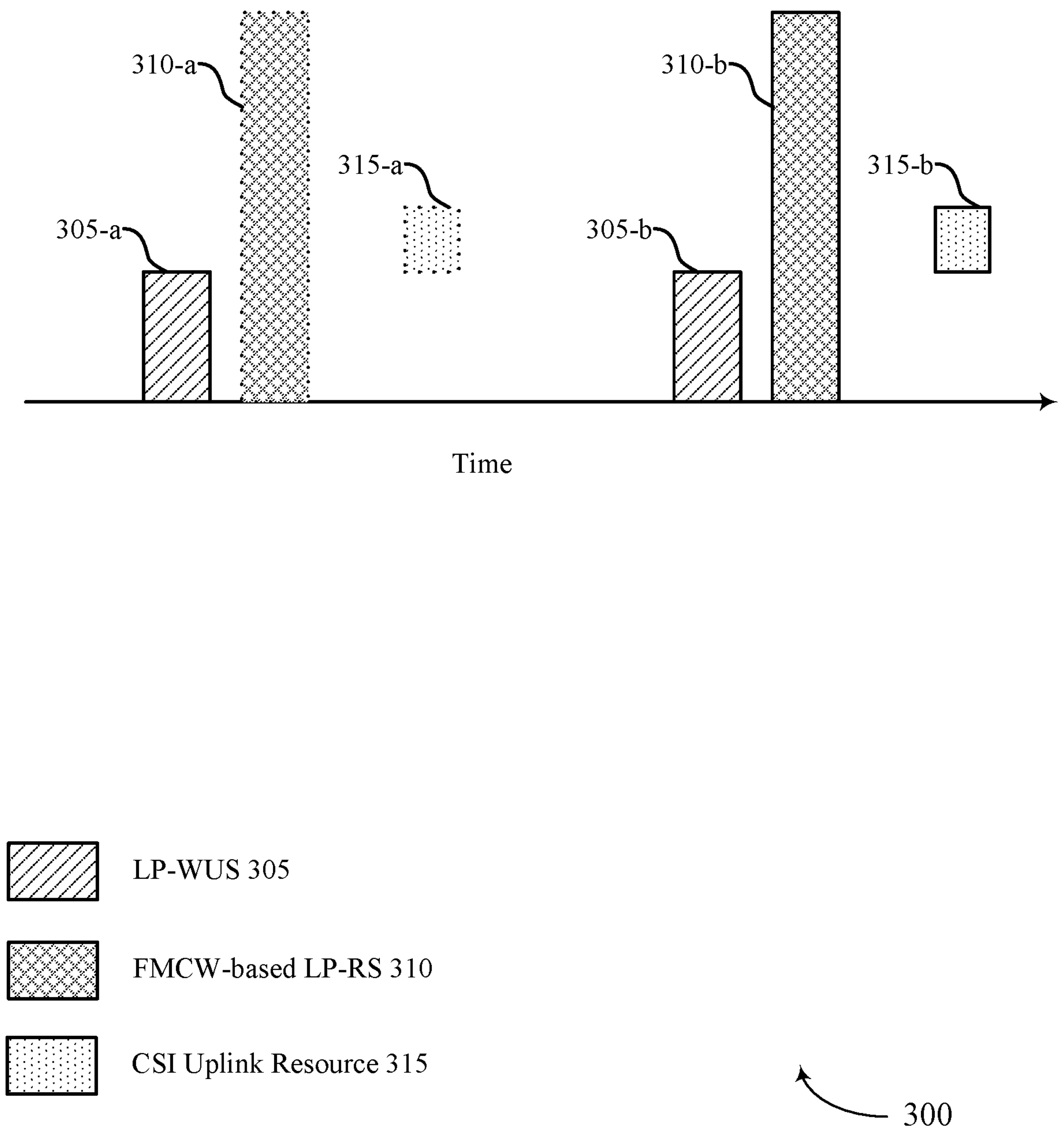
FIGS. 3 and 4 show examples of timing diagrams that support measuring CSI and/or CSF using FMCW-based LP-RSs in accordance with one or more aspects of the present disclosure.

FIG. 3 shows an example of a timing diagram 300 that supports measuring CSI and/or CSF using FMCW-based LP-RSs in accordance with one or more aspects of the present disclosure. The timing diagram 300 may implement or may be implemented by aspects of the wireless communications system 100 or the signaling diagram 200. For example, the timing diagram 300 may be implemented by a UE 115 or a network entity 105, which may be examples of the corresponding devices as described with reference to FIGS. 1 and 2.

In some examples, as illustrated with reference to FIG. 3, a UE 115 may receive one or more FMCW-based LP-RSs 310 that are separate from one or more LP-WUSs 305. That is, the FMCW-based LP-RSs 310 may be dedicated reference signals (e.g., different from LP-WUSs 305 and LP-SSs). The UE 115 may transmit CSI reports (e.g., including CSF) via CSI uplink resources 315.

In some examples, the UE 115 may receive an LP-WUS 305-*a* from a network entity 105 (e.g., via an LP-WUR of the UE 115) indicating for the UE 115 to sleep (e.g., to enter a sleep mode or to remain in a sleep mode). In such examples, the UE 115 may not monitor for an FMCW-based LP-RS 310-*a* and may skip a CSI uplink resource 315-*a* (e.g., a resource for the UE 115 to transmit CSF related to the FMCW-based LP-RS 310-*a*). In some examples, the UE 115 may receive an LP-WUS 305-*b* from a network entity 105 (e.g., via the LP-WUR) indicating for the UE 115 to wake up (e.g., to exit a sleep mode). The UE 115 may accordingly monitor for an FMCW-based LP-RS 310-*b* from a network entity 105 via the LP-WUR. The FMCW-based LP-RS 310-*b* may be a periodic reference signal or an on-demand aperiodic reference signal.

In some examples, a frequency domain resource allocation (FDRA) and/or a time domain resource allocation (TDRA) for the FMCW-based LP-RS 310-*b* may be indicated via the LP-WUS 305-*a*. In some examples, an offset between an FDRA and/or a TDRA of the LP-WUS 305-*b* and the FMCW-based LP-RS 310-*b* may be indicated via the LP-WUS 305-*a*. Additionally, or alternatively, the UE 115 may be configured (e.g., pre-configured via RRC signaling) with a set of FDRAs and/or TDRAs (e.g., or with a set of FDRA and/or TDRA offsets between the LP-WUS 305-*b* and the FMCW-based LP-RS 310-*b*). The UE 115 may receive an indication of an index of an FDRA and/or TDRA for the FMCW-based LP-RS 310-*b* (e.g., or an indication of an index of an FDRA and/or TDRA offset) via the LP-WUS 305-*b*. Such an index may reference an FDRA and/or a TDRA or an FDRA and/or TDRA offset may respective sets configured via RRC signaling.

The UE 115 may perform FMCW-based wideband channel estimation using the LP-WUR (e.g., a narrowband baseband LP-WUR), as described herein with reference to FIG. 2. The UE 115 may accordingly report the channel estimation (e.g., via CSF) to the network entity 105 via a CSI uplink resource 315-*b*. The CSI uplink resource 315-*b* may be a pre-configured configured grant uplink resource. In some examples, the CSI uplink resource 315-*b* may be shared (e.g., common) for both of the LP-WUR and a main radio of the UE 115. In some other examples, the CSI uplink resource 315-*b* may be separately configured for CSF obtained via the LP-WUR (such that the wireless communication device receiving the CSF, such as a network entity 105, may identify or otherwise determine whether the CSF is obtained via an LP-WUR or a main radio of the UE 115).

Figure 4:
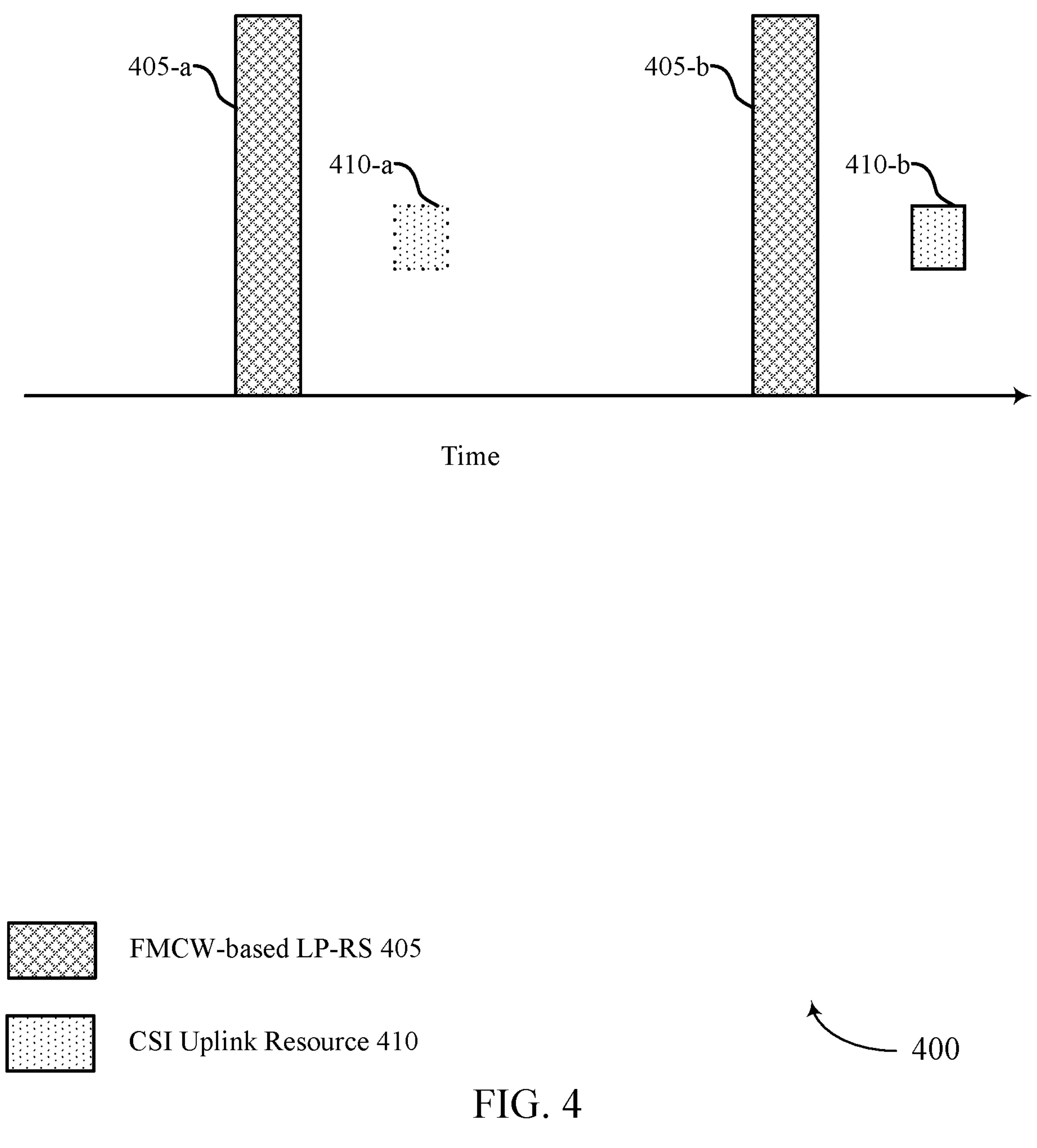

FIG. 4 shows an example of a timing diagram 400 that supports measuring CSI and/or CSF using FMCW-based LP-RSs in accordance with one or more aspects of the present disclosure. The timing diagram 400 may implement or may be implemented by aspects of the wireless communications system 100, the signaling diagram 200, or the timing diagram 300. For example, the timing diagram 400 may be implemented by a UE 115 or a network entity 105, which may be examples of the corresponding devices as described with reference to FIGS. 1 and 2.

In some examples, as illustrated with reference to FIG. 4, a UE 115 may receive one or more FMCW-based LP-RSs 405 from a network entity 105 (e.g., in lieu of receiving one or more LP-WUSs). In such examples, the FMCW-based LP-RSs 405 may include some (e.g., relatively small) payload information to indicate wake-up information to the UE 115 (e.g., whether the UE 115 should wake up or go to sleep). Such techniques may reduce latency, signaling overhead, and power use as compared to techniques using both FMCW-based LP-RSs and LP-WUSs. The UE 115 may transmit CSI reports (e.g., including CSF) via CSI uplink resources 410.

The network entity 105 may indicate the payload of the FMCW-based LP-RSs 405 by modulating the FMCW-based LP-RSs 405 (e.g., with a specific slope or a varying slope, with a specific OCC or a varying OCC, with a specific cyclic shift or varying cyclic shifts, with a specific zero-tail length or varying zero-tail length, and/or with a specific triangular chirp or varying triangular chirp). As described herein, an OCC may be an encoding technique used to encode the FMCW-based LP-RSs 405. A cyclic shift may be a starting position in a function (e.g., a time-domain starting position of a time-domain function) of the FMCW-based LP-RSs 405. A zero-tail length may refer to a quantity of zeros in a border of a discrete Fourier transform (DFT). A triangular chirp may refer to an amount of frequency increase and/or decrease of the FMCW-based LP-RSs 405.

In some examples, the UE 115 may receive an FMCW-based LP-RS 405-*a* from a network entity 105 (e.g., via an LP-WUR of the UE 115) indicating for the UE 115 to sleep (e.g., to enter a sleep mode or to remain in a sleep mode). The UE 115 may therefore skip a CSI uplink resource 410-*a* (e.g., a resource for the UE 115 to transmit CSF related to the FMCW-based LP-RS 405-*a*). In some examples, the UE 115 may receive an FMCW-based LP-RS 405-*b* from a network entity 105 (e.g., via the LP-WUR) indicating for the UE 115 to wake up (e.g., to exit a sleep mode).

If the UE 115 is indicated to wake up, the UE 115 may perform FMCW-based wideband channel estimation using the LP-WUR (e.g., a narrowband baseband LP-WUR), as described herein with reference to FIG. 2. The UE 115 may accordingly report the channel estimation (e.g., via CSF) to the network entity 105 via a CSI uplink resource 410-*b*. The CSI uplink resource 410-*b* may be a pre-configured configured grant uplink resource. In some examples, the CSI uplink resource 410-*b* may be shared (e.g., common) for both of the LP-WUR and a main radio of the UE 115. In some other examples, the CSI uplink resource 410-*b* may be separately configured for CSF obtained via the LP-WUR (such that the wireless communication device receiving the CSF, such as a network entity 105, may identify or otherwise determine whether the CSF is obtained via an LP-WUR or a main radio of the UE 115).

Figure 5:
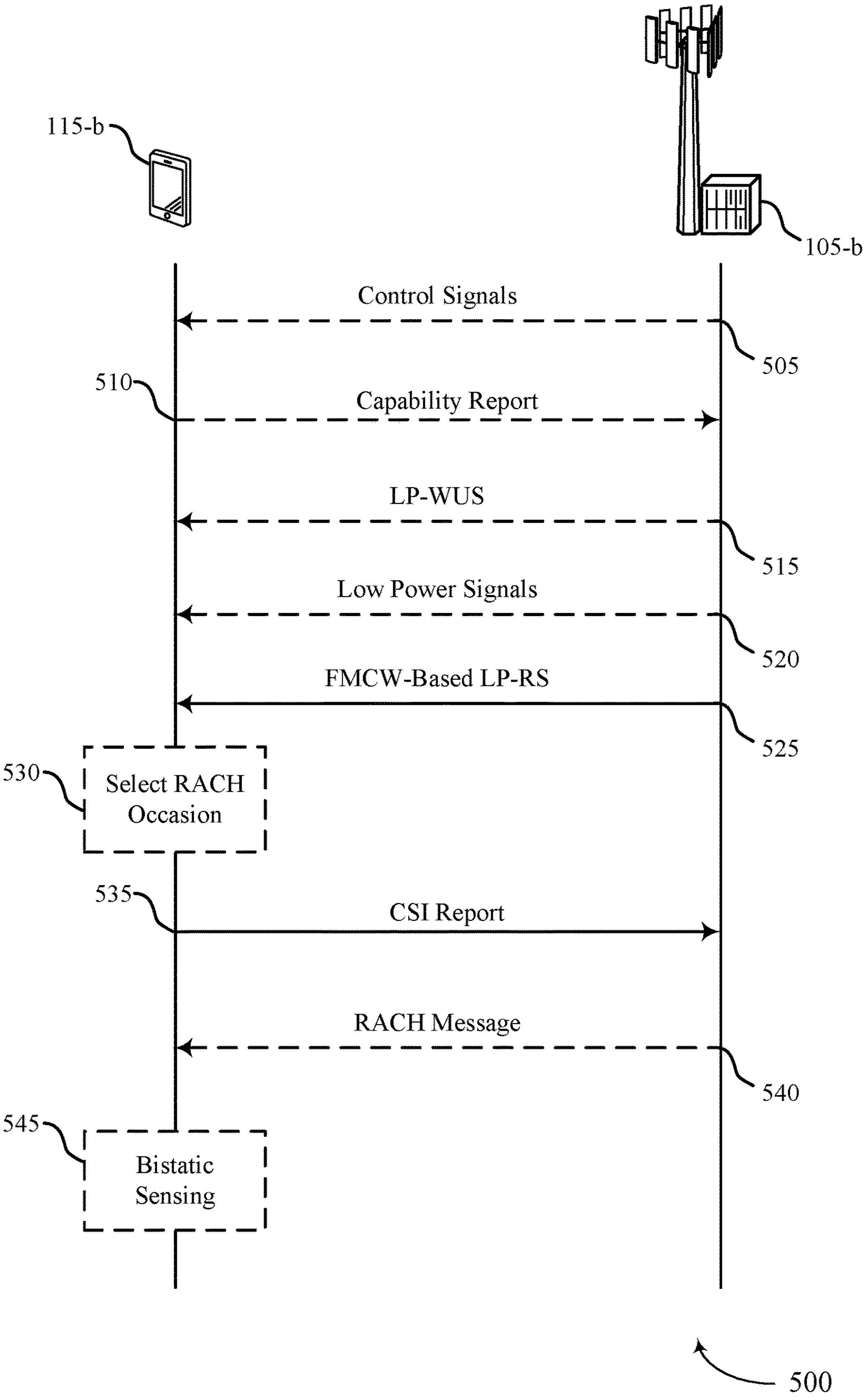
FIG. 5 shows an example of a process flow that supports measuring CSI and/or CSF using FMCW-based LP-RSs in accordance with one or more aspects of the present disclosure.

FIG. 5 shows an example of a process flow 500 that supports measuring CSI and/or CSF using FMCW-based LP-RSs in accordance with one or more aspects of the present disclosure. The process flow 500 may implement or may be implemented by aspects of the wireless communications system 100, the signaling diagram 200, the timing diagram 300, or the timing diagram 400. For example, the process flow 500 may be implemented by a UE 115 (e.g., a UE 115-*b*) or a network entity 105 (e.g., a network entity 105-*b*), which may be examples of the corresponding devices as described with reference to FIGS. 1 and 2.

In the following description of the process flow 500, the operations between the UE 115-*b* and the network entity 105-*b* may occur in a different order than the example order shown and, in some examples, may be performed by one or more different devices other than those shown as examples. Some operations also may be omitted from the process flow 500, and other operations may be added to the process flow 500. Further, although some operations or signaling may be shown to occur at different times for discussion purposes, these operations may actually occur at the same time.

In some examples, at 505, the network entity 105-*b* may output control signaling (e.g., RRC signaling, medium access control-control element (MAC-CE) signaling, downlink control information (DCI), or any combination thereof) to the UE 115-*b* (e.g., via a PDCCH). In some examples, the control signaling may indicate a resource allocation or a plurality of resource allocations (e.g., a set of FDRAs and/or TDRAs each corresponding to an index) for an FMCW-based LP-RS. In some examples, the control signaling may indicate a resource allocation offset or a plurality of resource allocation offsets (e.g., a set of FDRA offsets and/or TDRA offsets each corresponding to an index) from resources allocated for with an LP-WUS to resources allocated for the FMCW-based LP-RS. In some examples, the control signaling may indicate resource allocations for the LP-RS.

In some examples, the control signaling may include a resource allocation for one or more CSI reports (e.g., CSF transmissions). For example, the control signaling may configure the UE 115-*b* with a shared resource allocation for CSI reports from with the LP-WUR and CSI reports from the main radio of the UE 115-*b*. Additionally, or alternatively, the control signaling may indicate a first resource allocation for a CSI report from the LP-WUS (e.g., based on an FMCW-based LP-RS) and a second resource allocation for a CSI report from the main radio (e.g., based on CSI-RSs).

In some examples, at 510, the network entity 105-*b* may obtain a capability report from the UE 115-*b*. The capability report may indicate a capability of the UE 115-*b* to perform FMCW-based wideband channel estimation via the LP-WUR (e.g., an LP-WUR with a narrowband baseband processing capability). Additionally, or alternatively, the capability report may include an FMCW-based channel estimation bandwidth supported by the LP-WUR, a granularity of channel estimation supported by the LP-WUR, a quantity of subbands for channel estimation supported by the LP-WUR, a timing gap between a reception time of an FMCW-based LP-RS and a transmission time of a CSI report, a capability of the LP-WUR to perform bistatic sensing via one or more FMCW-based LP-RSs, or some combination thereof. The UE 115-*b* may transmit the capability report via a MAC-CE, uplink control information (UCI), random access signaling, or any combination thereof.

In some examples, at 515, the network entity 105-*b* may output an LP-WUS to the UE 115-*b*. The LP-WUS may indicate for the UE 115-*b* to monitor for the FMCW-based LP-RS. In some examples, the LP-WUS may indicate a resource allocation for the FMCW-based LP-RS (e.g., or an index of the resource allocation for the FMCW-based LP-RS from the set of FDRAs and/or TDRAs). In some examples, the LP-WUS may indicate a resource allocation offset between resources allocated for the LP-WUS and resources allocated for the FMCW-based LP-RS (e.g., or an index of the resource allocation offset from the set of FDRA and/or TDRA offsets).

In some examples, at 520, the network entity 105-*b* may output one or more low power signals (e.g., LP-WUSs, FMCW-based LP-RSs, LP-SSs, LP-RSs, or any combination thereof) to the UE 115-*b*. The one or more low power signals may indicate for the UE 115-*b* to transition from an RRC inactive or idle mode (e.g., with the main radio powered off and the LP-WUR powered on) to an RRC connected mode (e.g., with the main radio powered on).

At 525, the network entity 105-*b* may output the FMCW-based LP-RS (e.g., via the resources indicated via the control signaling and/or the LP-WUS). The UE 115-*b* may receive the FMCW-based LP-RS at the LP-WUR via a first bandwidth associated with the baseband processing capability of the LP-WUR and measure CSI based on the FMCW-based LP-RS. The UE 115-*b* may generate a CSI report based on receiving the FMCW-based LP-RS. In some examples, the FMCW-based LP-RS may indicate wake-up information (e.g., via a slope, OCC, cyclic shift, triangular chirp, or some combination thereof of the FMCW-based LP-RS). The wake-up information may indicate for the UE 115-*b* to wake up (e.g., power on the main radio or transmit a CSI report) or to enter or remain in a sleep mode (e.g., skip CSI report resources or power off the main radio).

In some examples, at 530, the UE 115-*b* may select a RACH opportunity to use for a message of a RACH procedure (e.g., msg3, msgA). The UE 115-*b* may select the RACH opportunity based on the FMCW-based LP-RS (e.g., based on the measured CSI).

At 535, the network entity 105-*b* may obtain the CSI report from the UE 115-*b*. The feedback report may include CSF associated with a second bandwidth (e.g., a wideband bandwidth) that includes the first bandwidth. The UE 115-*b* may transmit the CSI report via a message of a RACH procedure (e.g., via the selected RACH occasion). In some examples, at 540, the network entity 105-*b* may output another message of the RACH procedure (e.g., msg4 of a four-step RACH procedure or msgB of a two-step RACH procedure). The other message of the RACH procedure may include a resource grant for one or more messages (e.g., based on the CSI report).

In some examples, at 545, the UE 115-*b* may perform bistatic sensing via (or otherwise using) the LP-WUR. For example, the network entity 105-*b* may indicate for the UE 115-*b* to perform the bistatic sensing (e.g., in accordance with the capability of the LP-WUR or the UE 115-*b* to perform bistatic sensing). The UE 115-*b* may perform the bistatic sensing using the FMCW-based LP-RS.

Figure 6:
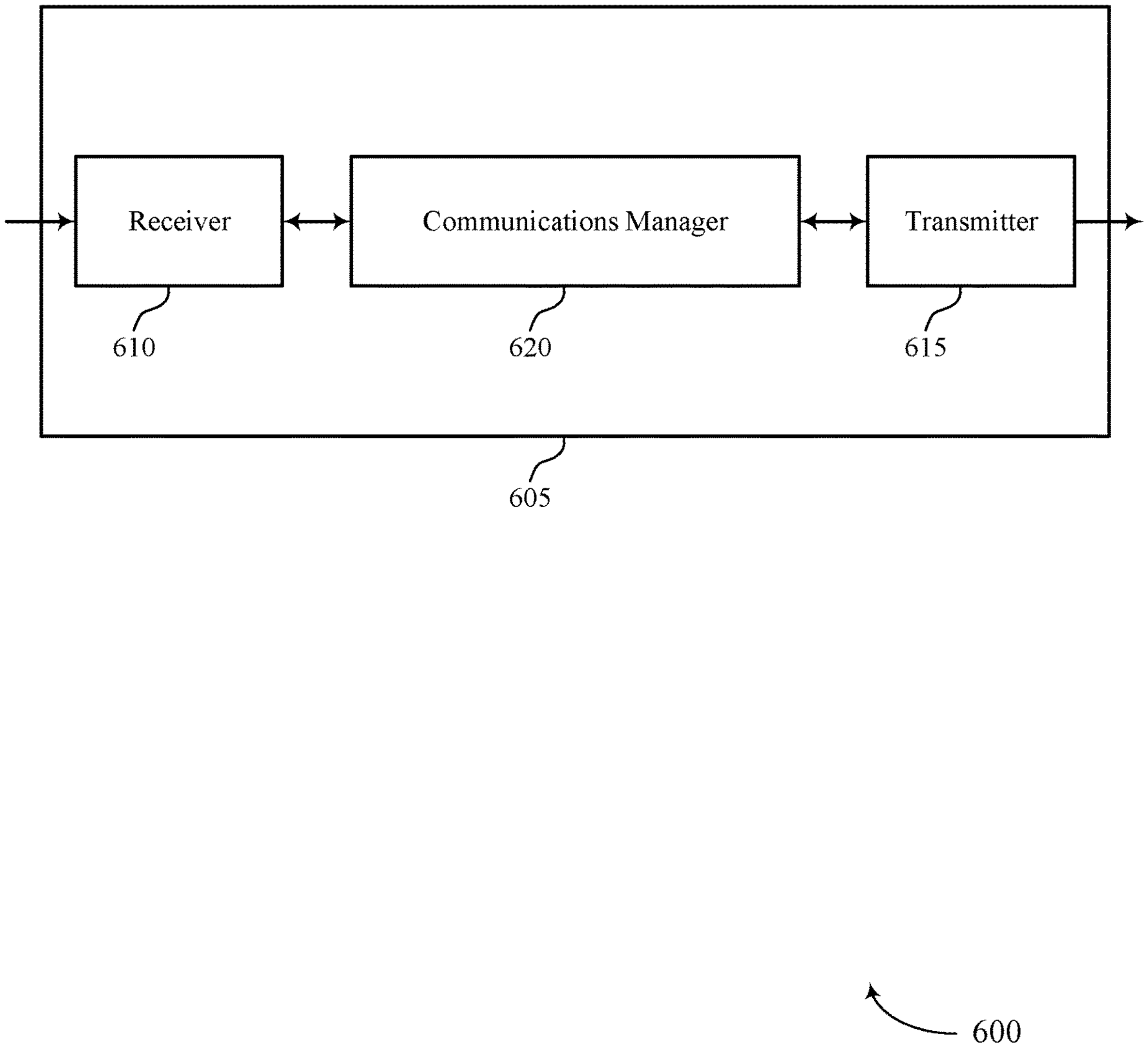
FIGS. 6 and 7 show block diagrams of devices that support measuring CSI and/or CSF using FMCW-based LP-RSs in accordance with one or more aspects of the present disclosure.

FIG. 6 shows a block diagram 600 of a device 605 that supports measuring CSI and/or CSF using FMCW-based LP-RSs in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to measuring CSI and/or CSF using FMCW-based LP-RSs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to measuring CSI and/or CSF using FMCW-based LP-RSs). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations or components thereof may be examples of means for performing various aspects of measuring CSI and/or CSF using FMCW-based LP-RSs as described herein. For example, the communications manager 620, the receiver 610, the transmitter 615, or various combinations or components thereof may be capable of performing one or more of the functions described herein. The communications manager 620, or its sub-components, may be implemented in hardware, software (e.g., executed by a processor), or any combination thereof.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), a graphics processing unit (GPU), a neural processing unit (NPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, a GPU, an NPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving, at an LP-WUR of the UE, an FMCW-based LP-RS via a first bandwidth associated with a baseband processing capability of the LP-WUR. The communications manager 620 is capable of, configured to, or operable to support a means for transmitting, based on receiving the FMCW-based LP-RS via the first bandwidth, a CSI report including CSF associated with a second bandwidth, where the second bandwidth includes the first bandwidth.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for performing CSI measurements at an LP-WUR using FMCW-based LP-RSs, which may result in reduced power consumption and more efficient utilization of communication resources.

Figure 7:
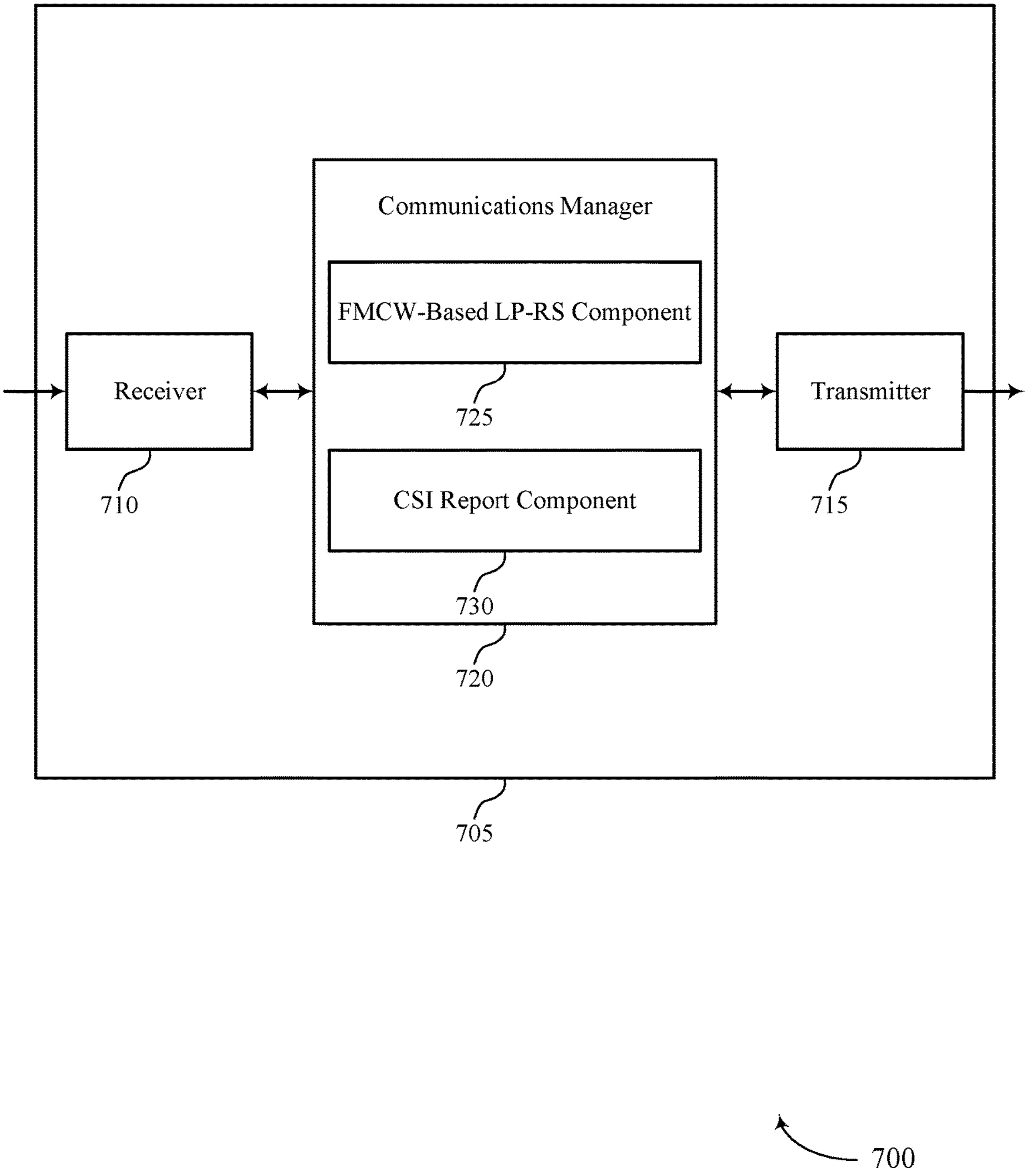

FIG. 7 shows a block diagram 700 of a device 705 that supports measuring CSI and/or CSF using FMCW-based LP-RSs in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to measuring CSI and/or CSF using FMCW-based LP-RSs). Information may be passed on to other components of the device 705. The receiver 710 may utilize a single antenna or a set of multiple antennas.

The transmitter 715 may provide a means for transmitting signals generated by other components of the device 705.

For example, the transmitter 715 may transmit information such as packets, user data, control information, or any combination thereof associated with various information channels (e.g., control channels, data channels, information channels related to measuring CSI and/or CSF using FMCW-based LP-RSs). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of measuring CSI and/or CSF using FMCW-based LP-RSs as described herein. For example, the communications manager 720 may include an FMCW-based LP-RS component 725 a CSI report component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The FMCW-based LP-RS component 725 is capable of, configured to, or operable to support a means for receiving, at an LP-WUR of the UE, an FMCW-based LP-RS via a first bandwidth associated with a baseband processing capability of the LP-WUR. The CSI report component 730 is capable of, configured to, or operable to support a means for transmitting, based on receiving the FMCW-based LP-RS via the first bandwidth, a CSI report including CSF associated with a second bandwidth, where the second bandwidth includes the first bandwidth.

Figure 8:
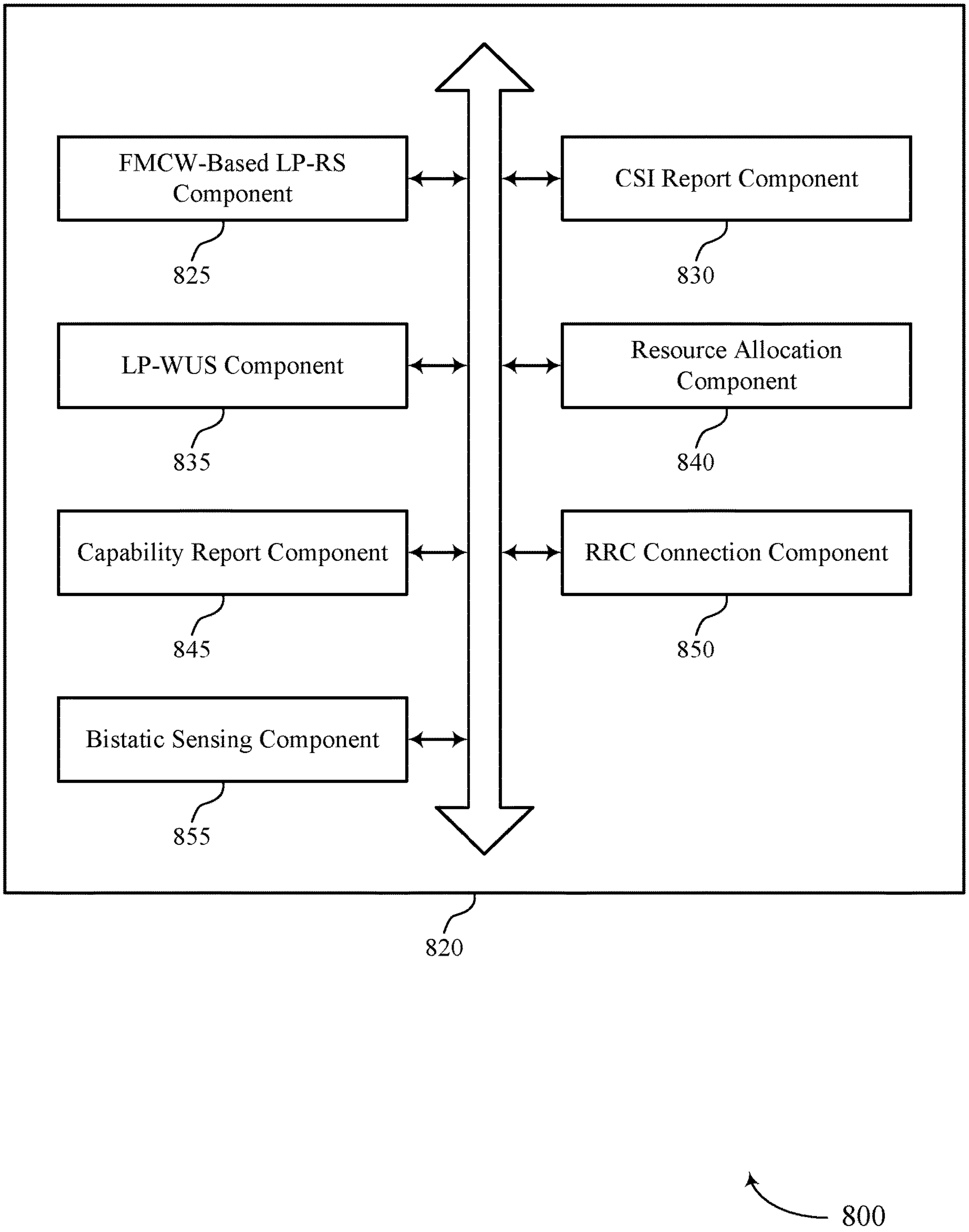
FIG. 8 shows a block diagram of a communications manager that supports measuring CSI and/or CSF using FMCW-based LP-RSs in accordance with one or more aspects of the present disclosure.

FIG. 8 shows a block diagram 800 of a communications manager 820 that supports measuring CSI and/or CSF using FMCW-based LP-RSs in accordance with one or more aspects of the present disclosure. The communications manager 820 may be an example of aspects of a communications manager 620, a communications manager 720, or both, as described herein. The communications manager 820, or various components thereof, may be an example of means for performing various aspects of measuring CSI and/or CSF using FMCW-based LP-RSs as described herein. For example, the communications manager 820 may include an FMCW-based LP-RS component 825, a CSI report component 830, an LP-WUS component 835, a resource allocation component 840, a capability report component 845, an RRC connection component 850, a bistatic sensing component 855, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The FMCW-based LP-RS component 825 is capable of, configured to, or operable to support a means for receiving, at an LP-WUR of the UE, an FMCW-based LP-RS via a first bandwidth associated with a baseband processing capability of the LP-WUR. The CSI report component 830 is capable of, configured to, or operable to support a means for transmitting, based on receiving the FMCW-based LP-RS via the first bandwidth, a CSI report including CSF associated with a second bandwidth, where the second bandwidth includes the first bandwidth.

In some examples, the LP-WUS component 835 is capable of, configured to, or operable to support a means for receiving, at the LP-WUR, an LP-WUS indicating for the UE to monitor for the FMCW-based LP-RS.

In some examples, the LP-WUS includes an indication of a first resource allocation for the FMCW-based LP-RS. In some examples, receiving the FMCW-based LP-RS is based on the first resource allocation.

In some examples, the resource allocation component 840 is capable of, configured to, or operable to support a means for receiving a control signal that indicates a set of multiple resource allocations including the first resource allocation for the FMCW-based LP-RS, where the indication includes an index, from a set of multiple indices corresponding to the set of multiple resource allocations, corresponding to the first resource allocation of the set of multiple resource allocations.

In some examples, the resource allocation component 840 is capable of, configured to, or operable to support a means for receiving a control signal that indicates a set of multiple resource allocation offsets between the first resource allocation for the FMCW-based LP-RS and a second resource allocation for the LP-WUS, where the indication includes an index, from a set of multiple indices corresponding to the set of multiple resource allocation offsets, corresponding to a first resource allocation offset of the set of multiple resource allocation offsets, where the first resource allocation is offset from the second resource allocation by the first resource allocation offset.

In some examples, the resource allocation component 840 is capable of, configured to, or operable to support a means for receiving a control signal that indicates a resource allocation offset between a first resource allocation for the FMCW-based LP-RS and a second resource allocation for the LP-WUS, where receiving the FMCW-based LP-RS is based on the resource allocation offset.

In some examples, to support receiving the FMCW-based LP-RS, the FMCW-based LP-RS component 825 is capable of, configured to, or operable to support a means for receiving wake-up information via the FMCW-based LP-RS.

In some examples, the FMCW-based LP-RS indicates the wake-up information via a slope of the FMCW-based LP-RS, via an OCC associated with the FMCW-based LP-RS, via a cyclic shift associated with the FMCW-based LP-RS, via a triangular chirp associated with the FMCW-based LP-RS, or any combination thereof.

In some examples, the resource allocation component 840 is capable of, configured to, or operable to support a means for receiving a control signal that indicates a shared resource allocation for first CSI reports associated with the LP-WUR and second CSI reports associated with a main radio of the UE.

In some examples, the resource allocation component 840 is capable of, configured to, or operable to support a means for receiving a control signal that indicates a first resource allocation for first CSI reports associated with the LP-WUR and a second resource allocation for second CSI reports associated with a main radio of the UE.

In some examples, the capability report component 845 is capable of, configured to, or operable to support a means for transmitting a capability report including an indication of a capability of the LP-WUR to perform FMCW-based wideband channel estimation.

In some examples, the capability report indicates one or more of an FMCW-based channel estimation bandwidth supported by the LP-WUR, a granularity of wideband channel estimation supported by the LP-WUR, a quantity of subbands for channel estimation supported by the LP-WUR, a timing gap between a reception time associated with the FMCW-based LP-RS and a transmission time associated with the CSI report, or any combination thereof.

In some examples, the RRC connection component 850 is capable of, configured to, or operable to support a means for receiving a low-power signal indicating for the UE to transition from a RRC idle or inactive state to a RRC connected state, where the RRC idle or inactive state is a state in which the LP-WUR is powered on and a main radio of the UE is powered off.

In some examples, to support transmitting the CSI report, the CSI report component 830 is capable of, configured to, or operable to support a means for transmitting the CSI report via a message of a random access channel procedure.

In some examples, the resource allocation component 840 is capable of, configured to, or operable to support a means for selecting a random access channel occasion associated with the random access channel procedure based on the CSI report being based on the FMCW-based LP-RS.

In some examples, the resource allocation component 840 is capable of, configured to, or operable to support a means for receiving, in accordance with transmitting the message, a second message of the random access channel procedure including a resource grant for one or more messages, where the resource grant is based on the CSI report.

In some examples, the bistatic sensing component 855 is capable of, configured to, or operable to support a means for performing bistatic sensing based on receiving the FMCW-based LP-RS via the LP-WUR.

In some examples, the capability report component 845 is capable of, configured to, or operable to support a means for transmitting a capability report indicating a capability of the UE to perform, using the LP-WUR, bistatic sensing associated with reception of FMCW-based LP-RSs, where performing the bistatic sensing is based on the capability.

In some examples, the baseband processing capability of the LP-WUR is a narrowband baseband processing capability.

Figure 9:
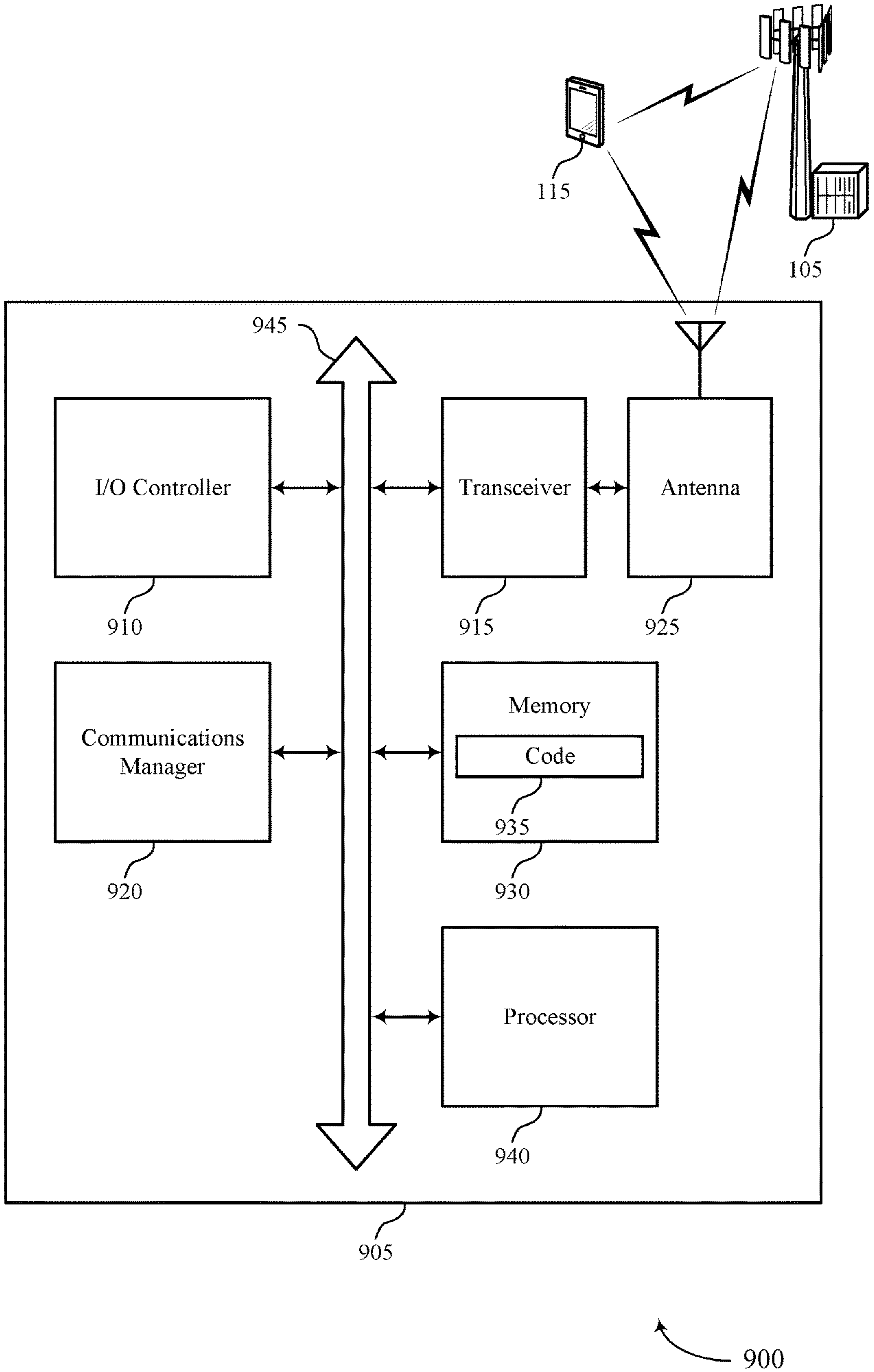
FIG. 9 shows a diagram of a system including a device that supports measuring CSI and/or CSF using FMCW-based LP-RSs in accordance with one or more aspects of the present disclosure.

FIG. 9 shows a diagram of a system 900 including a device 905 that supports measuring CSI and/or CSF using FMCW-based LP-RSs in accordance with one or more aspects of the present disclosure. The device 905 may be an example of or include components of a device 605, a device 705, or a UE 115 as described herein. The device 905 may communicate (e.g., wirelessly) with one or more other devices (e.g., network entities 105, UEs 115, or a combination thereof). The device 905 may include components for bi-directional voice and data communications including components for transmitting and receiving communications, such as a communications manager 920, an input/output (I/O) controller, such as an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna. However, in some other cases, the device 905 may have more than one antenna, which may be capable of concurrently transmitting or receiving multiple wireless transmissions. The transceiver 915 may communicate bi-directionally via the one or more antennas 925 using wired or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable, or processor-executable code, such as the code 935. The code 935 may include instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may include, among other things, a basic I/O system (BIOS) which may control basic hardware or software operation such as the interaction with peripheral components or devices.

The at least one processor 940 may include one or more intelligent hardware devices (e.g., one or more general-purpose processors, one or more DSPs, one or more CPUs, one or more GPUs, one or more NPUs (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting measuring CSI and/or CSF using FMCW-based LP-RSs). For example, the device 905 or a component of the device 905 may include at least one processor 940 and at least one memory 930 coupled with or to the at least one processor 940, the at least one processor 940 and the at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving, at an LP-WUR of the UE, an FMCW-based LP-RS via a first bandwidth associated with a baseband processing capability of the LP-WUR. The communications manager 920 is capable of, configured to, or operable to support a means for transmitting, based on receiving the FMCW-based LP-RS via the first bandwidth, a CSI report including CSF associated with a second bandwidth, where the second bandwidth includes the first bandwidth.

By including or configuring the communications manager 920 in accordance with examples as described herein, the device 905 may support techniques for performing CSI measurements at an LP-WUR using FMCW-based LP-RSs, which may result in more efficient utilization of communication resources and longer battery life.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of measuring CSI and/or CSF using FMCW-based LP-RSs as described herein, or the at least one processor 940 and the at least one memory 930 may be otherwise configured to, individually or collectively, perform or support such operations.

Figure 10:
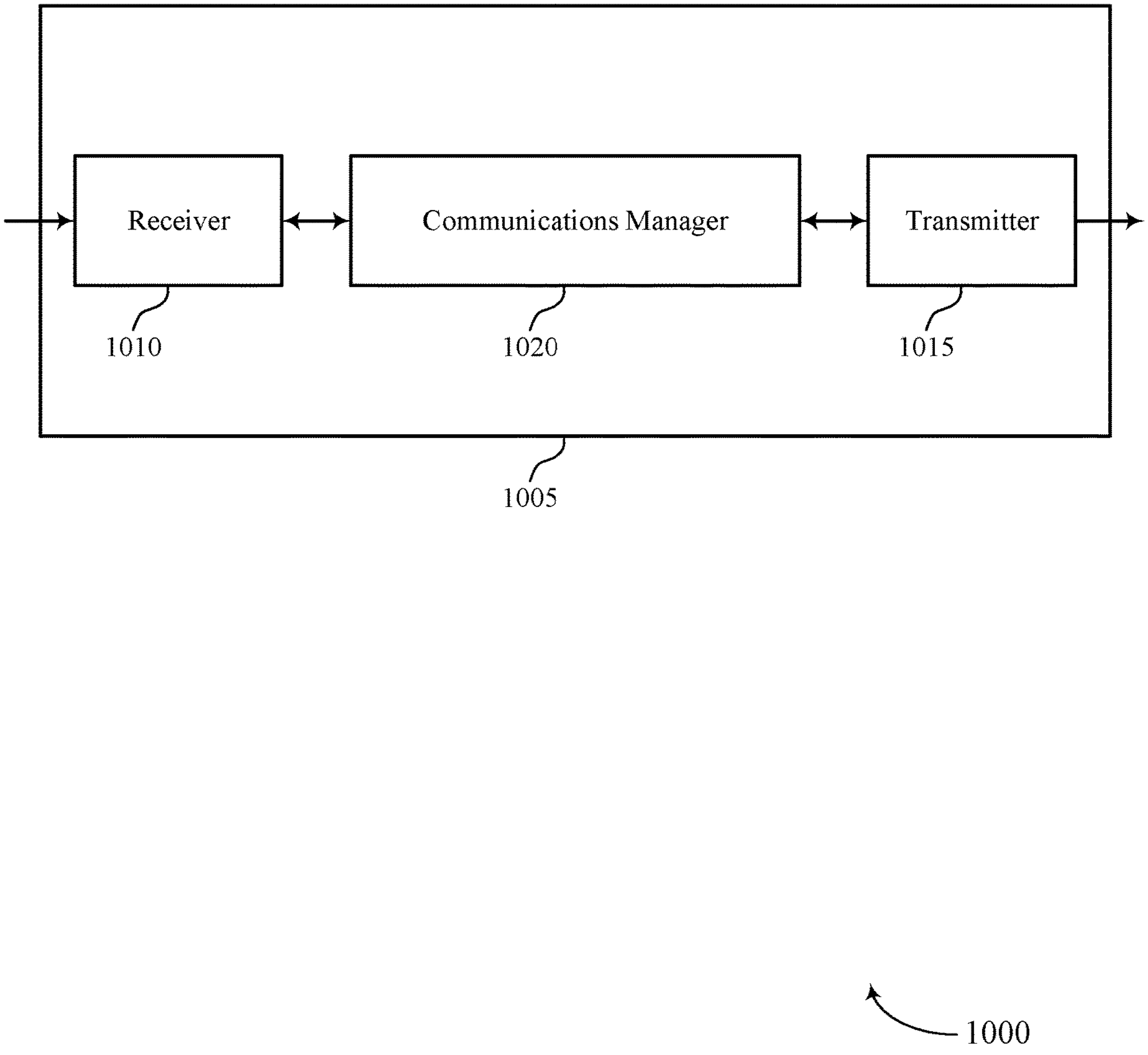
FIGS. 10 and 11 show block diagrams of devices that support measuring CSI and/or CSF using FMCW-based LP-RSs in accordance with one or more aspects of the present disclosure.

FIG. 10 shows a block diagram 1000 of a device 1005 that supports measuring CSI and/or CSF using FMCW-based LP-RSs in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations or components thereof may be examples of means for performing various aspects of measuring CSI and/or CSF using FMCW-based LP-RSs as described herein. For example, the communications manager 1020, the receiver 1010, the transmitter 1015, or various combinations or components thereof may be capable of performing one or more of the functions described herein. The communications manager 1020, or its sub-components, may be implemented in hardware, software (e.g., executed by a processor), or any combination thereof.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, a GPU, an NPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software) executed by at least one processor (e.g., referred to as a processor-executable code). If implemented in code executed by at least one processor, the functions of the communications manager 1020, the receiver 1010, the transmitter 1015, or various combinations or components thereof may be performed by a general-purpose processor, a DSP, a CPU, a GPU, an NPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for obtaining, from a UE, a capability report including an indication of a capability of an LP-WUR of the UE to perform FMCW-based wideband channel estimation. The communications manager 1020 is capable of, configured to, or operable to support a means for outputting, in accordance with the capability of the LP-WUR of the UE, an FMCW-based LP-RS. The communications manager 1020 is capable of, configured to, or operable to support a means for obtaining, based on outputting the FMCW-based LP-RS, a CSI report including CSF.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for performing CSI measurements at an LP-WUR using FMCW-based LP-RSs, which may result in reduced power consumption and more efficient utilization of communication resources.

Figure 11:
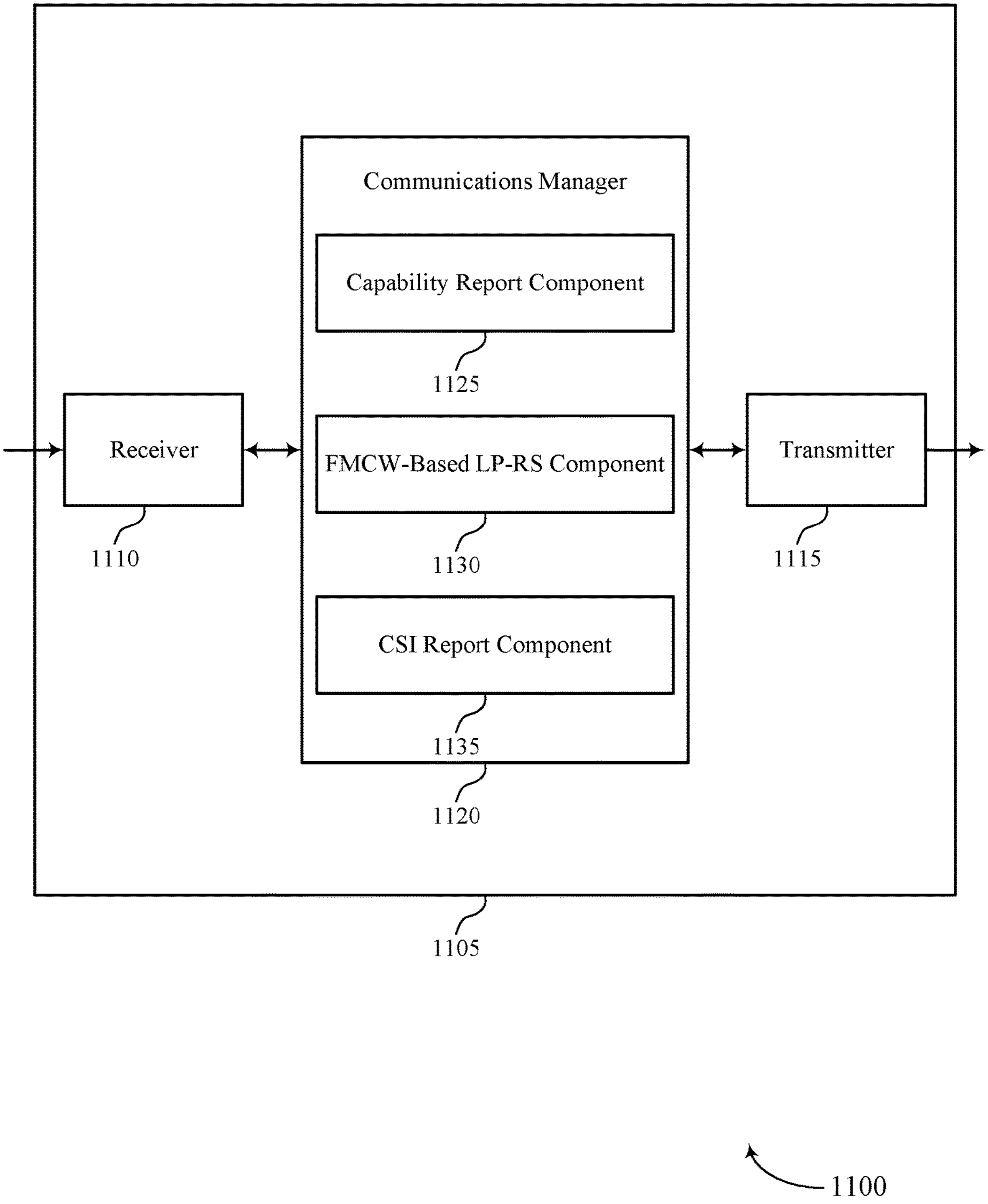

FIG. 11 shows a block diagram 1100 of a device 1105 that supports measuring CSI and/or CSF using FMCW-based LP-RSs in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of measuring CSI and/or CSF using FMCW-based LP-RSs as described herein. For example, the communications manager 1120 may include a capability report component 1125, an FMCW-based LP-RS component 1130, a CSI report component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The capability report component 1125 is capable of, configured to, or operable to support a means for obtaining, from a UE, a capability report including an indication of a capability of an LP-WUR of the UE to perform FMCW-based wideband channel estimation. The FMCW-based LP-RS component 1130 is capable of, configured to, or operable to support a means for outputting, in accordance with the capability of the LP-WUR of the UE, an FMCW-based LP-RS. The CSI report component 1135 is capable of, configured to, or operable to support a means for obtaining, based on outputting the FMCW-based LP-RS, a CSI report including CSF.

Figure 12:
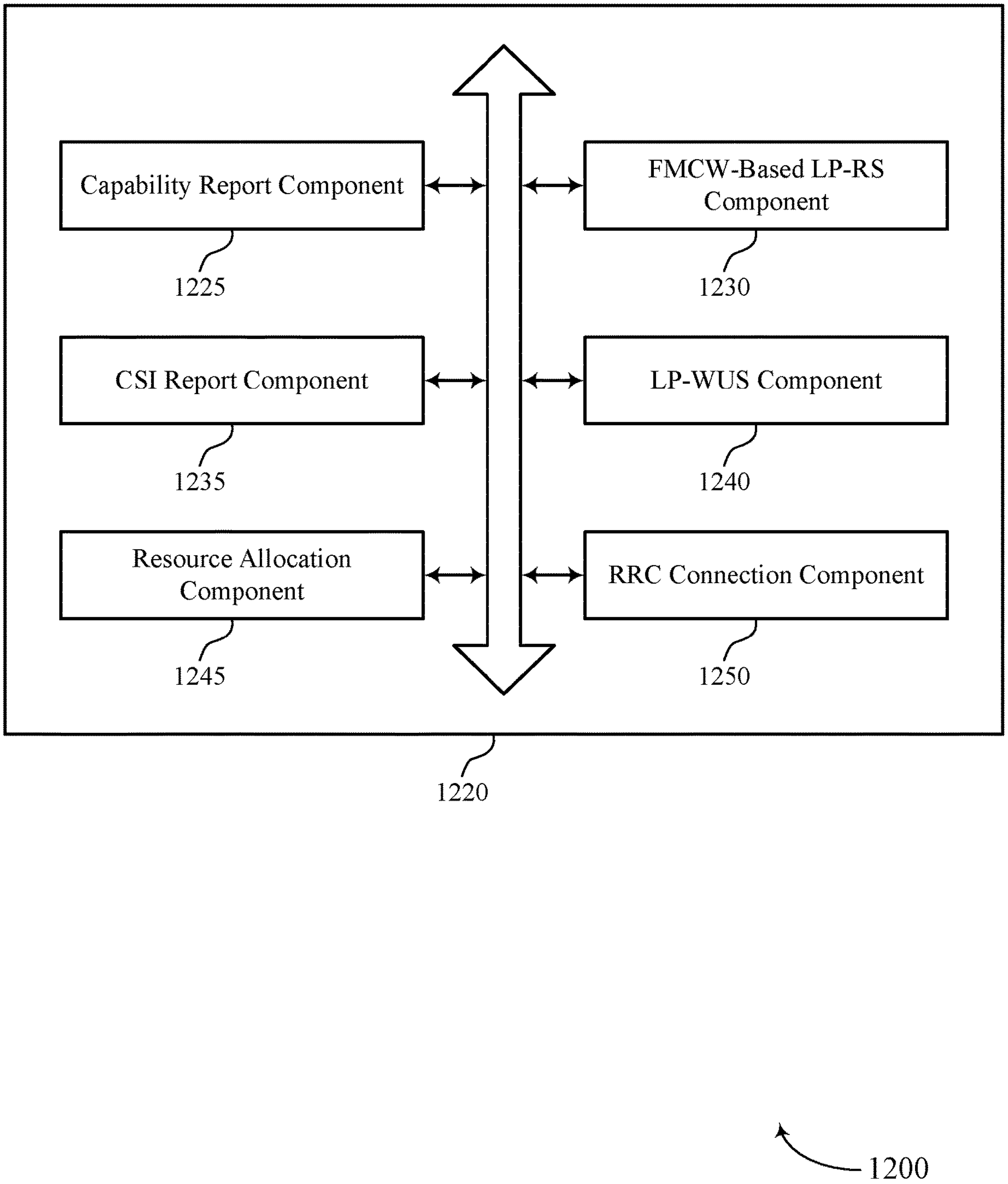
FIG. 12 shows a block diagram of a communications manager that supports measuring CSI and/or CSF using FMCW-based LP-RSs in accordance with one or more aspects of the present disclosure.

FIG. 12 shows a block diagram 1200 of a communications manager 1220 that supports measuring CSI and/or CSF using FMCW-based LP-RSs in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of measuring CSI and/or CSF using FMCW-based LP-RSs as described herein. For example, the communications manager 1220 may include a capability report component 1225, an FMCW-based LP-RS component 1230, a CSI report component 1235, an LP-WUS component 1240, a resource allocation component 1245, an RRC connection component 1250, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The capability report component 1225 is capable of, configured to, or operable to support a means for obtaining, from a UE, a capability report including an indication of a capability of an LP-WUR of the UE to perform FMCW-based wideband channel estimation. The FMCW-based LP-RS component 1230 is capable of, configured to, or operable to support a means for outputting, in accordance with the capability of the LP-WUR of the UE, an FMCW-based LP-RS. The CSI report component 1235 is capable of, configured to, or operable to support a means for obtaining, based on outputting the FMCW-based LP-RS, a CSI report including CSF.

In some examples, the LP-WUS component 1240 is capable of, configured to, or operable to support a means for outputting an LP-WUS indicating for the UE to monitor for the FMCW-based LP-RS.

In some examples, the LP-WUS includes an indication of a first resource allocation for the FMCW-based LP-RS. In some examples, outputting the FMCW-based LP-RS is based on the first resource allocation.

In some examples, the resource allocation component 1245 is capable of, configured to, or operable to support a means for outputting a control signal that indicates a set of multiple resource allocations including the first resource allocation for the FMCW-based LP-RS, where the indication includes an index, from a set of multiple indices corresponding to the set of multiple resource allocations, corresponding to the first resource allocation of the set of multiple resource allocations.

In some examples, the resource allocation component 1245 is capable of, configured to, or operable to support a means for outputting a control signal that indicates a set of multiple resource allocation offsets between the first resource allocation for the FMCW-based LP-RS and a second resource allocation for the LP-WUS, where the indication includes an index, from a set of multiple indices corresponding to the set of multiple resource allocation offsets, corresponding to a first resource allocation offset of the set of multiple resource allocation offsets, where the first resource allocation is offset from the second resource allocation by the first resource allocation offset.

In some examples, the resource allocation component 1245 is capable of, configured to, or operable to support a means for outputting a control signal that indicates a resource allocation offset between a first resource allocation for the FMCW-based LP-RS and a second resource allocation for the LP-WUS, where outputting the FMCW-based LP-RS is based on the resource allocation offset.

In some examples, to support outputting the FMCW-based LP-RS, the FMCW-based LP-RS component 1230 is capable of, configured to, or operable to support a means for outputting wake-up information via the FMCW-based LP-RS.

In some examples, the FMCW-based LP-RS indicates the wake-up information via a slope of the FMCW-based LP-RS, via an OCC associated with the FMCW-based LP-RS, via a cyclic shift associated with the FMCW-based LP-RS, via a triangular chirp associated with the FMCW-based LP-RS, or any combination thereof.

In some examples, the resource allocation component 1245 is capable of, configured to, or operable to support a means for outputting a control signal that indicates a shared resource allocation for first CSI reports associated with the LP-WUR and second CSI reports associated with a main radio of the UE.

In some examples, the resource allocation component 1245 is capable of, configured to, or operable to support a means for outputting a control signal that indicates a first resource allocation for first CSI reports associated with the LP-WUR and a second resource allocation for second CSI reports associated with a main radio of the UE.

In some examples, the capability report indicates one or more of an FMCW-based channel estimation bandwidth supported by the LP-WUR, a granularity of wideband channel estimation supported by the LP-WUR, a quantity of subbands for channel estimation supported by the LP-WUR, a timing gap between a reception time associated with the FMCW-based LP-RS and a transmission time associated with the CSI report, or any combination thereof.

In some examples, the RRC connection component 1250 is capable of, configured to, or operable to support a means for outputting a low-power signal indicating for the UE to transition from a RRC idle or inactive state to a RRC connected state, where the RRC idle or inactive state is a state in which the LP-WUR is powered on and a main radio of the UE is powered off.

In some examples, to support obtaining the CSI report, the CSI report component 1235 is capable of, configured to, or operable to support a means for obtaining the CSI report via a message of a random access channel procedure.

In some examples, a random access channel occasion associated with the random access channel procedure is based on the CSI report being based on the FMCW-based LP-RS.

In some examples, the resource allocation component 1245 is capable of, configured to, or operable to support a means for outputting, in accordance with obtaining the message, a second message of the random access channel procedure including a resource grant for one or more messages, where the resource grant is based on the CSI report.

In some examples, the capability report component 1225 is capable of, configured to, or operable to support a means for obtaining, via the capability report, an indication of a capability of the UE to perform, using the LP-WUR, bistatic sensing associated with reception of FMCW-based LP-RSs.

In some examples, a baseband processing capability of the LP-WUR is a narrowband baseband processing capability.

Figure 13:
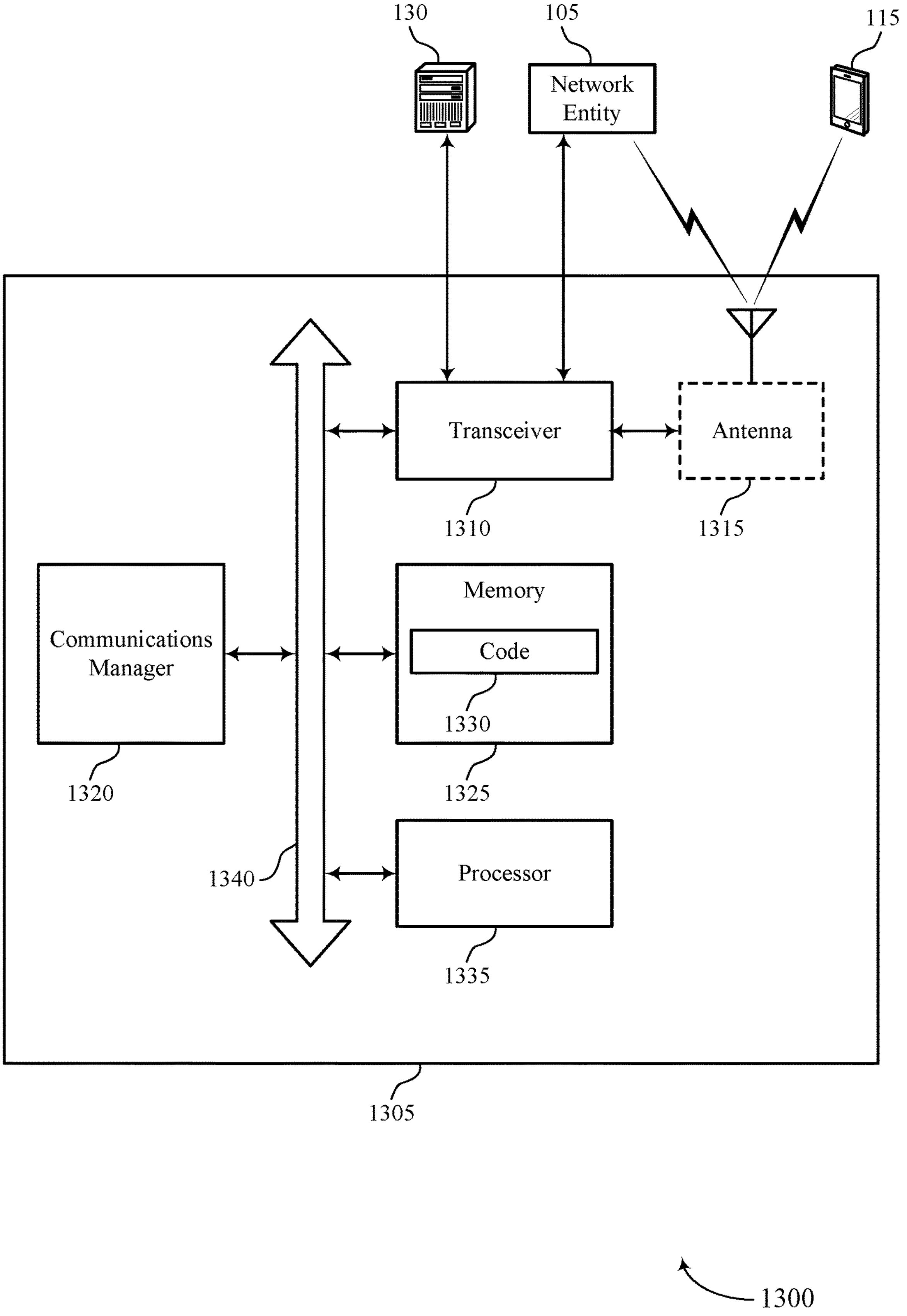
FIG. 13 shows a diagram of a system including a device that supports measuring CSI and/or CSF using FMCW-based LP-RSs in accordance with one or more aspects of the present disclosure.

FIG. 13 shows a diagram of a system 1300 including a device 1305 that supports measuring CSI and/or CSF using FMCW-based LP-RSs in accordance with one or more aspects of the present disclosure. The device 1305 may be an example of or include components of a device 1005, a device 1105, or a network entity 105 as described herein. The device 1305 may communicate with other network devices or network equipment such as one or more of the network entities 105, UEs 115, or any combination thereof. The communications may include communications over one or more wired interfaces, over one or more wireless interfaces, or any combination thereof. The device 1305 may include components that support outputting and obtaining communications, such as a communications manager 1320, a transceiver 1310, one or more antennas 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., communication link(s) 125, backhaul communication link(s) 120, a midhaul communication link 162, a fronthaul communication link 168).

The at least one memory 1325 may include RAM, ROM, or any combination thereof. The at least one memory 1325 may store computer-readable, computer-executable, or processor-executable code, such as the code 1330. The code 1330 may include instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may include, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include one or more intelligent hardware devices (e.g., one or more general-purpose processors, one or more DSPs, one or more CPUs, one or more GPUs, one or more NPUs (also referred to as neural network processors or DLPs), one or more microcontrollers, one or more ASICs, one or more FPGAs, one or more programmable logic devices, discrete gate or transistor logic, one or more discrete hardware components, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting measuring CSI and/or CSF using FMCW-based LP-RSs). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with one or more other network entities 105, and may include a controller or scheduler for controlling communications with UEs 115 (e.g., in cooperation with the one or more other network devices). In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for obtaining, from a UE, a capability report including an indication of a capability of an LP-WUR of the UE to perform FMCW-based wideband channel estimation. The communications manager 1320 is capable of, configured to, or operable to support a means for outputting, in accordance with the capability of the LP-WUR of the UE, an FMCW-based LP-RS. The communications manager 1320 is capable of, configured to, or operable to support a means for obtaining, based on outputting the FMCW-based LP-RS, a CSI report including CSF.

By including or configuring the communications manager 1320 in accordance with examples as described herein, the device 1305 may support techniques for performing CSI measurements at an LP-WUR using FMCW-based LP-RSs, which may result in more efficient utilization of communication resources and longer battery life.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of measuring CSI and/or CSF using FMCW-based LP-RSs as described herein, or the at least one processor 1335 and the at least one memory 1325 may be otherwise configured to, individually or collectively, perform or support such operations.

Figure 14:
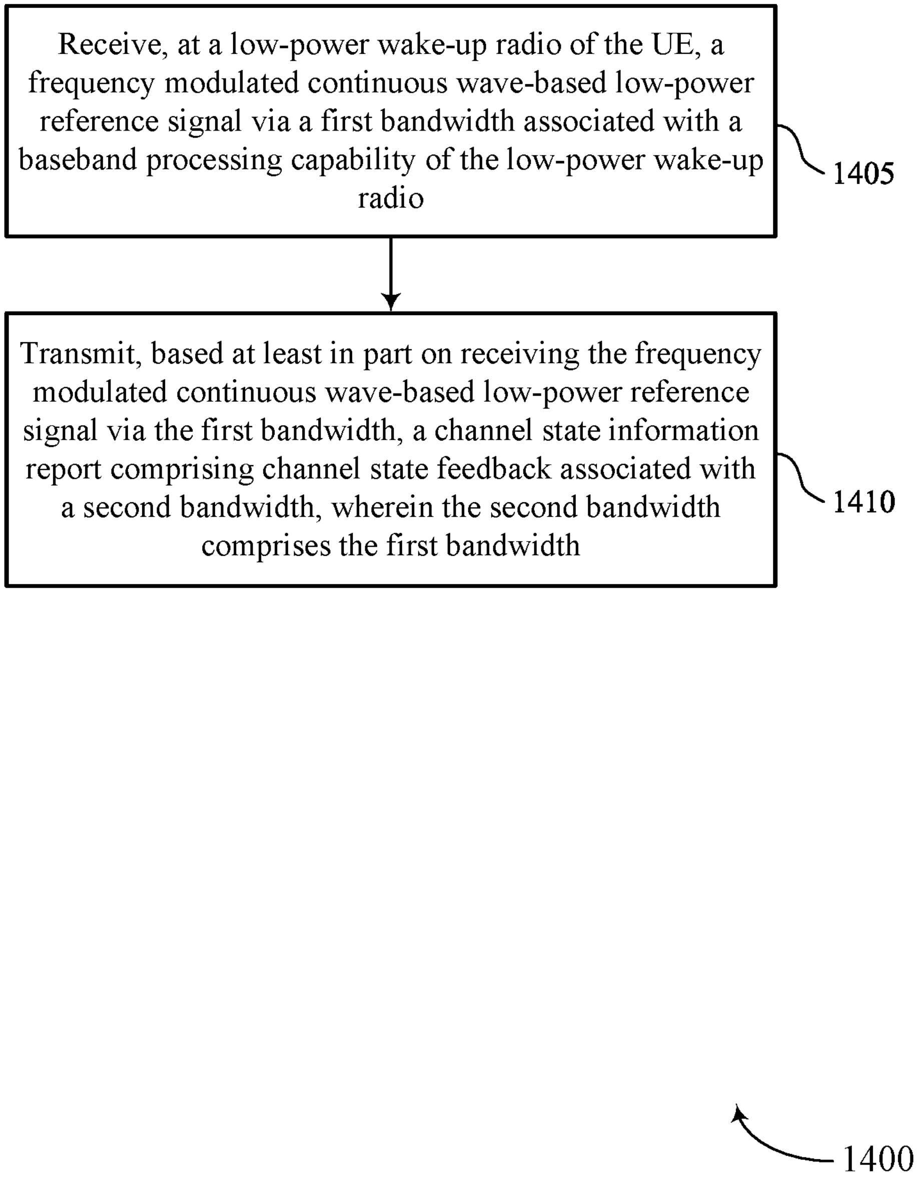
FIGS. 14 through 19 show flowcharts illustrating methods that support measuring CSI and/or CSF using FMCW-based LP-RSs in accordance with one or more aspects of the present disclosure.

FIG. 14 shows a flowchart illustrating a method 1400 that supports measuring CSI and/or CSF using FMCW-based LP-RSs in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, at an LP-WUR of the UE, an FMCW-based LP-RS via a first bandwidth associated with a baseband processing capability of the LP-WUR. The operations of 1405 may be performed in accordance with examples as disclosed herein. In some examples, aspects of the operations of 1405 may be performed by an FMCW-based LP-RS component 825 as described with reference to FIG. 8.

At 1410, the method may include transmitting, based at least in part on receiving the FMCW-based LP-RS via the first bandwidth, a CSI report comprising CSF associated with a second bandwidth, wherein the second bandwidth comprises the first bandwidth. The operations of 1410 may be performed in accordance with examples as disclosed herein. In some examples, aspects of the operations of 1410 may be performed by a CSI report component 830 as described with reference to FIG. 8.

Figure 15:
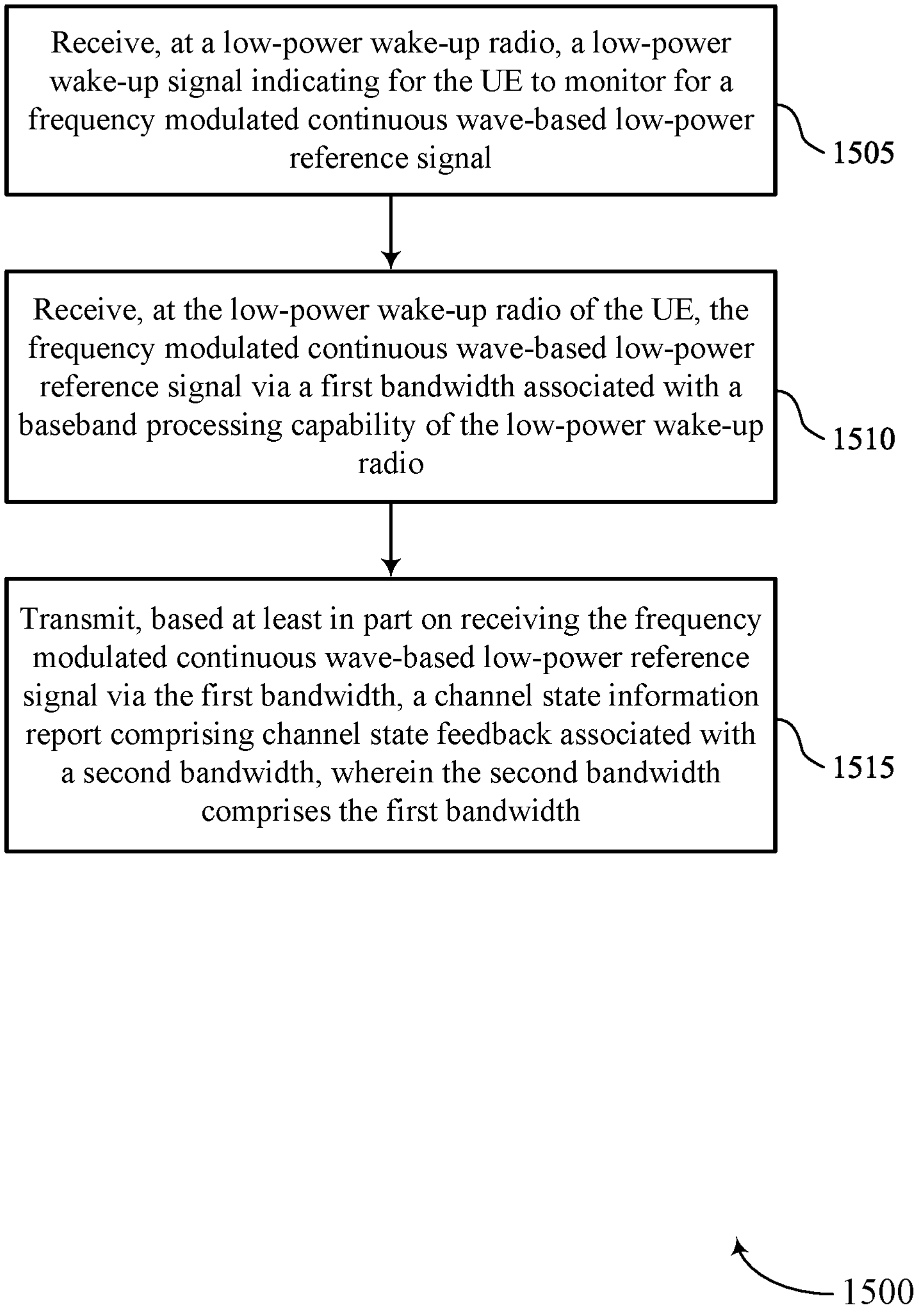

FIG. 15 shows a flowchart illustrating a method 1500 that supports measuring CSI and/or CSF using FMCW-based LP-RSs in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, at an LP-WUR, an LP-WUS indicating for the UE to monitor for an FMCW-based LP-RS. The operations of 1505 may be performed in accordance with examples as disclosed herein. In some examples, aspects of the operations of 1505 may be performed by an LP-WUS component 835 as described with reference to FIG. 8.

At 1510, the method may include receiving, at the LP-WUR of the UE, the FMCW-based LP-RS via a first bandwidth associated with a baseband processing capability of the LP-WUR. The operations of 1510 may be performed in accordance with examples as disclosed herein. In some examples, aspects of the operations of 1510 may be performed by an FMCW-based LP-RS component 825 as described with reference to FIG. 8.

At 1515, the method may include transmitting, based at least in part on receiving the FMCW-based LP-RS via the first bandwidth, a CSI report comprising CSF associated with a second bandwidth, wherein the second bandwidth comprises the first bandwidth. The operations of 1515 may be performed in accordance with examples as disclosed herein. In some examples, aspects of the operations of 1515 may be performed by a CSI report component 830 as described with reference to FIG. 8.

Figure 16:
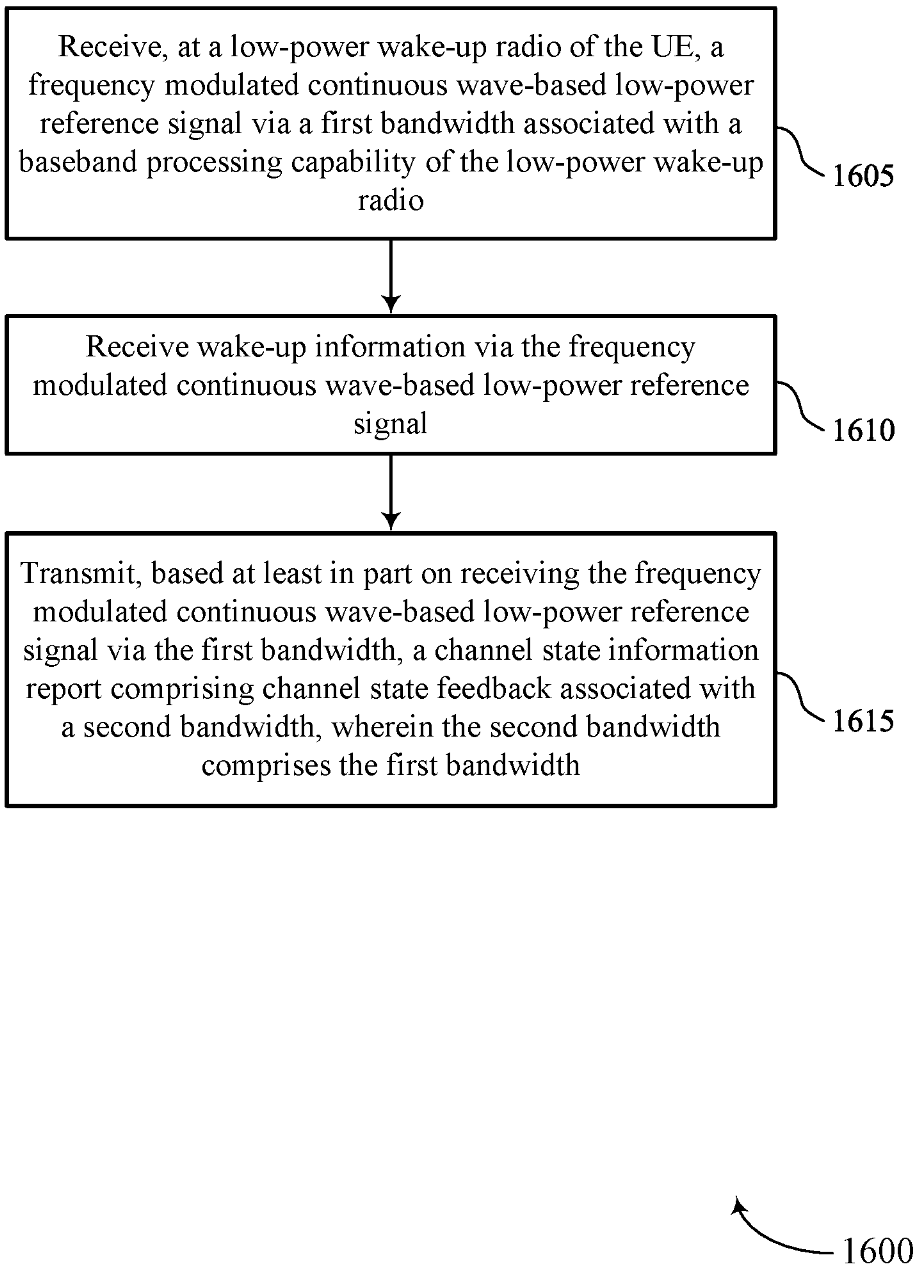

FIG. 16 shows a flowchart illustrating a method 1600 that supports measuring CSI and/or CSF using FMCW-based LP-RSs in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving, at an LP-WUR of the UE, an FMCW-based LP-RS via a first bandwidth associated with a baseband processing capability of the LP-WUR. The operations of 1605 may be performed in accordance with examples as disclosed herein. In some examples, aspects of the operations of 1605 may be performed by an FMCW-based LP-RS component 825 as described with reference to FIG. 8.

At 1610, the method may include receiving wake-up information via the FMCW-based LP-RS. The operations of 1610 may be performed in accordance with examples as disclosed herein. In some examples, aspects of the operations of 1610 may be performed by an FMCW-based LP-RS component 825 as described with reference to FIG. 8.

At 1615, the method may include transmitting, based at least in part on receiving the FMCW-based LP-RS via the first bandwidth, a CSI report comprising CSF associated with a second bandwidth, wherein the second bandwidth comprises the first bandwidth. The operations of 1615 may be performed in accordance with examples as disclosed herein. In some examples, aspects of the operations of 1615 may be performed by a CSI report component 830 as described with reference to FIG. 8.

Figure 17:
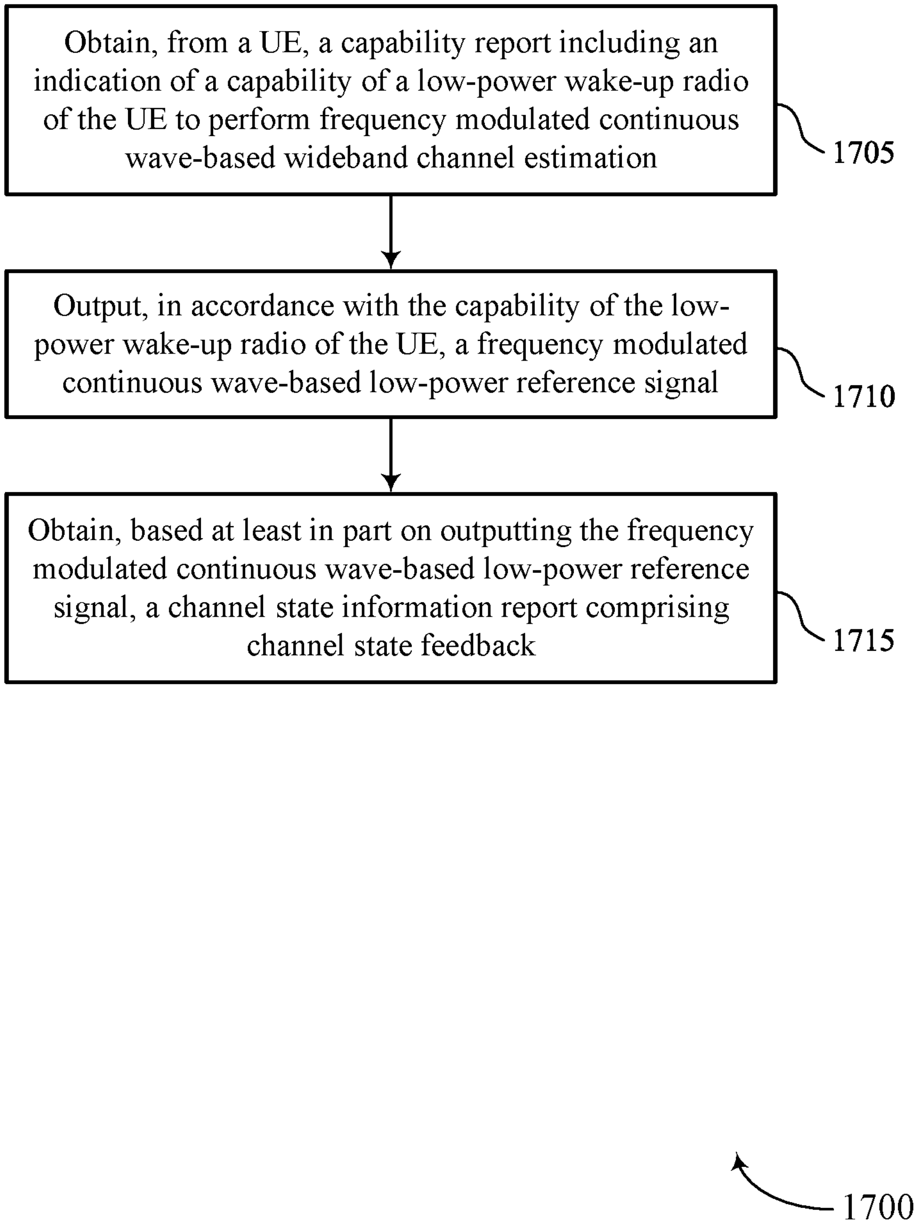

FIG. 17 shows a flowchart illustrating a method 1700 that supports measuring CSI and/or CSF using FMCW-based LP-RSs in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include obtaining, from a UE, a capability report including an indication of a capability of an LP-WUR of the UE to perform FMCW-based wideband channel estimation. The operations of 1705 may be performed in accordance with examples as disclosed herein. In some examples, aspects of the operations of 1705 may be performed by a capability report component 1225 as described with reference to FIG. 12.

At 1710, the method may include outputting, in accordance with the capability of the LP-WUR of the UE, an FMCW-based LP-RS. The operations of 1710 may be performed in accordance with examples as disclosed herein. In some examples, aspects of the operations of 1710 may be performed by an FMCW-based LP-RS component 1230 as described with reference to FIG. 12.

At 1715, the method may include obtaining, based at least in part on outputting the FMCW-based LP-RS, a CSI report comprising CSF. The operations of 1715 may be performed in accordance with examples as disclosed herein. In some examples, aspects of the operations of 1715 may be performed by a CSI report component 1235 as described with reference to FIG. 12.

Figure 18:
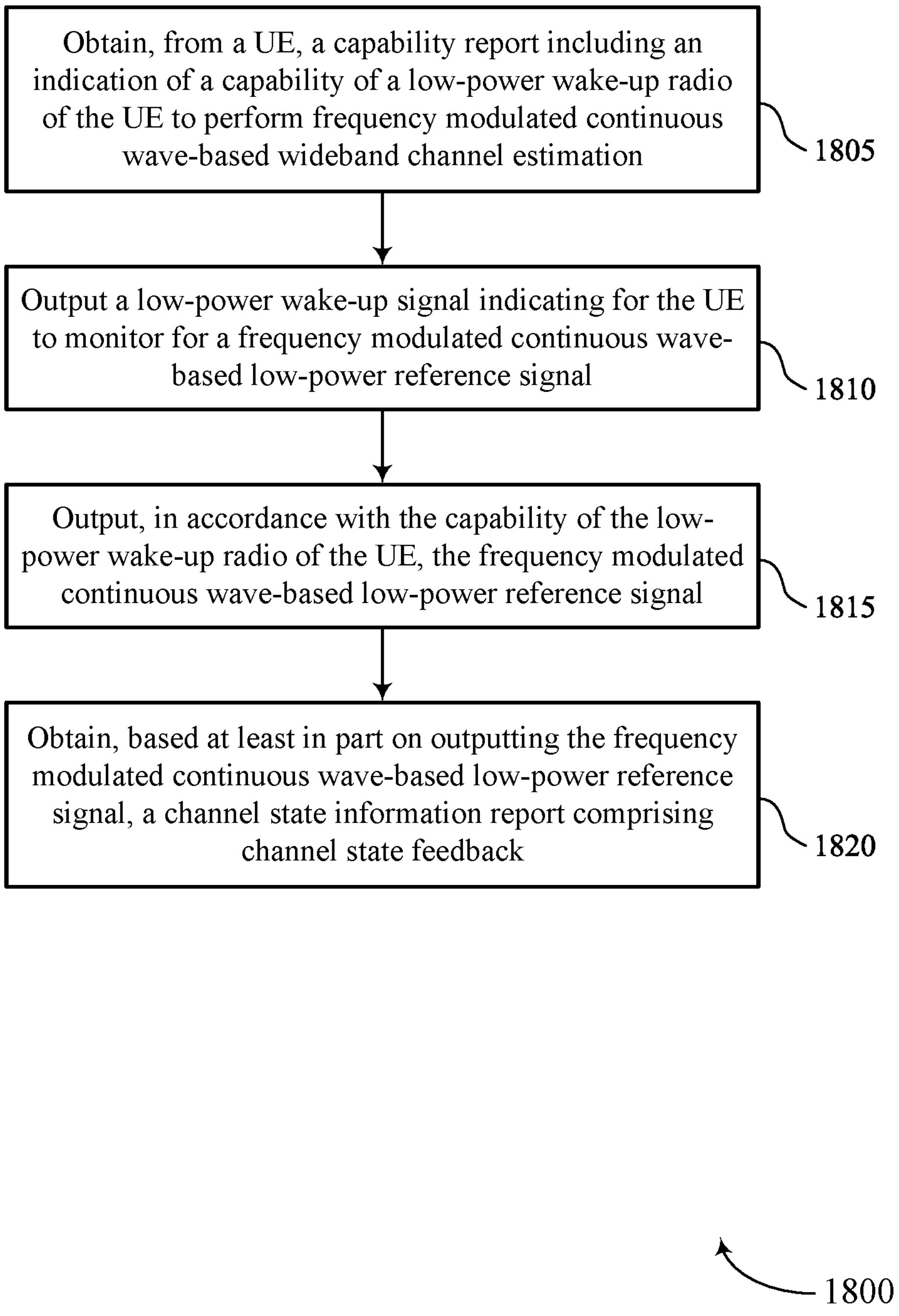

FIG. 18 shows a flowchart illustrating a method 1800 that supports measuring CSI and/or CSF using FMCW-based LP-RSs in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include obtaining, from a UE, a capability report including an indication of a capability of an LP-WUR of the UE to perform FMCW-based wideband channel estimation. The operations of 1805 may be performed in accordance with examples as disclosed herein. In some examples, aspects of the operations of 1805 may be performed by a capability report component 1225 as described with reference to FIG. 12.

At 1810, the method may include outputting an LP-WUS indicating for the UE to monitor for an FMCW-based LP-RS. The operations of 1810 may be performed in accordance with examples as disclosed herein. In some examples, aspects of the operations of 1810 may be performed by an LP-WUS component 1240 as described with reference to FIG. 12.

At 1815, the method may include outputting, in accordance with the capability of the LP-WUR of the UE, the FMCW-based LP-RS. The operations of 1815 may be performed in accordance with examples as disclosed herein. In some examples, aspects of the operations of 1815 may be performed by an FMCW-based LP-RS component 1230 as described with reference to FIG. 12.

At 1820, the method may include obtaining, based at least in part on outputting the FMCW-based LP-RS, a CSI report comprising CSF. The operations of 1820 may be performed in accordance with examples as disclosed herein. In some examples, aspects of the operations of 1820 may be performed by a CSI report component 1235 as described with reference to FIG. 12.

Figure 19:
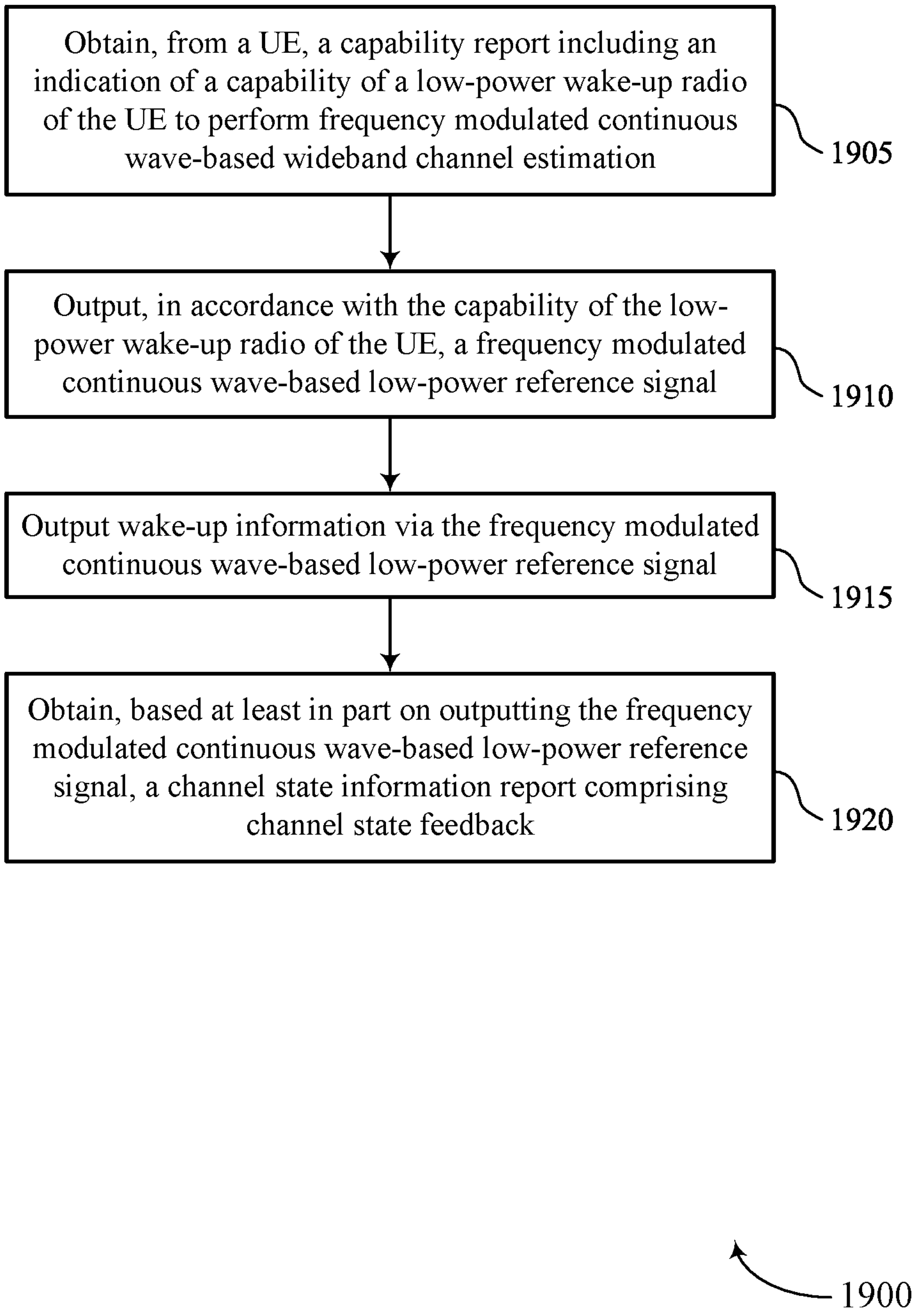

FIG. 19 shows a flowchart illustrating a method 1900 that supports measuring CSI and/or CSF using FMCW-based LP-RSs in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include obtaining, from a UE, a capability report including an indication of a capability of an LP-WUR of the UE to perform FMCW-based wideband channel estimation. The operations of 1905 may be performed in accordance with examples as disclosed herein. In some examples, aspects of the operations of 1905 may be performed by a capability report component 1225 as described with reference to FIG. 12.

At 1910, the method may include outputting, in accordance with the capability of the LP-WUR of the UE, an FMCW-based LP-RS. The operations of 1910 may be performed in accordance with examples as disclosed herein. In some examples, aspects of the operations of 1910 may be performed by an FMCW-based LP-RS component 1230 as described with reference to FIG. 12.

At 1915, the method may include outputting wake-up information via the FMCW-based LP-RS. The operations of 1915 may be performed in accordance with examples as disclosed herein. In some examples, aspects of the operations of 1915 may be performed by an FMCW-based LP-RS component 1230 as described with reference to FIG. 12.

At 1920, the method may include obtaining, based at least in part on outputting the FMCW-based LP-RS, a CSI report comprising CSF. The operations of 1920 may be performed in accordance with examples as disclosed herein. In some examples, aspects of the operations of 1920 may be performed by a CSI report component 1235 as described with reference to FIG. 12.

The following provides an overview of aspects of the present disclosure:

Aspect 1: A method for wireless communications by a UE, comprising: receiving, at a LP-WUR of the UE, a FMCW-based LP-RS via a first bandwidth associated with a baseband processing capability of the LP-WUR; and transmitting, based at least in part on receiving the FMCW-based LP-RS via the first bandwidth, a CSI report comprising CSF associated with a second bandwidth, wherein the second bandwidth comprises the first bandwidth.

Aspect 2: The method of aspect 1, further comprising: receiving, at the LP-WUR, a LP-WUS indicating for the UE to monitor for the FMCW-based LP-RS.

Aspect 3: The method of aspect 2, wherein the LP-WUS comprises an indication of a first resource allocation for the FMCW-based LP-RS, and wherein receiving the FMCW-based LP-RS is based at least in part on the first resource allocation.

Aspect 4: The method of aspect 3, further comprising: receiving a control signal that indicates a plurality of resource allocations including the first resource allocation for the FMCW-based LP-RS, wherein the indication comprises an index, from a plurality of indices corresponding to the plurality of resource allocations, corresponding to the first resource allocation of the plurality of resource allocations.

Aspect 5: The method of any of aspects 3 through 4, further comprising: receiving a control signal that indicates a plurality of resource allocation offsets between the first resource allocation for the FMCW-based LP-RS and a second resource allocation for the LP-WUS, wherein the indication comprises an index, from a plurality of indices corresponding to the plurality of resource allocation offsets, corresponding to a first resource allocation offset of the plurality of resource allocation offsets, wherein the first resource allocation is offset from the second resource allocation by the first resource allocation offset.

Aspect 6: The method of any of aspects 2 through 5, further comprising: receiving a control signal that indicates a resource allocation offset between a first resource allocation for the FMCW-based LP-RS and a second resource allocation for the LP-WUS, wherein receiving the FMCW-based LP-RS is based at least in part on the resource allocation offset.

Aspect 7: The method of aspect 1, wherein receiving the FMCW-based LP-RS comprises: receiving wake-up information via the FMCW-based LP-RS.

Aspect 8: The method of aspect 7, wherein the FMCW-based LP-RS indicates the wake-up information via a slope of the FMCW-based LP-RS, via an OCC associated with the FMCW-based LP-RS, via a cyclic shift associated with the FMCW-based LP-RS, via a triangular chirp associated with the FMCW-based LP-RS, or any combination thereof.

Aspect 9: The method of any of aspects 1 through 8, further comprising: receiving a control signal that indicates a shared resource allocation for first CSI reports associated with the LP-WUR and second CSI reports associated with a main radio of the UE.

Aspect 10: The method of any of aspects 1 through 9, further comprising: receiving a control signal that indicates a first resource allocation for first CSI reports associated with the LP-WUR and a second resource allocation for second CSI reports associated with a main radio of the UE.

Aspect 11: The method of any of aspects 1 through 10, further comprising: transmitting a capability report comprising an indication of a capability of the LP-WUR to perform FMCW-based wideband channel estimation.

Aspect 12: The method of aspect 11, wherein the capability report indicates one or more of a FMCW-based channel estimation bandwidth supported by the LP-WUR, a granularity of wideband channel estimation supported by the LP-WUR, a quantity of subbands for channel estimation supported by the LP-WUR, a timing gap between a reception time associated with the FMCW-based LP-RS and a transmission time associated with the CSI report, or any combination thereof.

Aspect 13: The method of any of aspects 1 through 12, further comprising: receiving a low-power signal indicating for the UE to transition from a RRC idle or inactive state to a RRC connected state, wherein the RRC idle or inactive state is a state in which the LP-WUR is powered on and a main radio of the UE is powered off.

Aspect 14: The method of any of aspects 1 through 13, wherein transmitting the CSI report comprises: transmitting the CSI report via a message of a RACH procedure.

Aspect 15: The method of aspect 14, further comprising: selecting a RACH occasion associated with the RACH procedure based at least in part on the CSI report being based at least in part on the FMCW-based LP-RS.

Aspect 16: The method of any of aspects 14 through 15, further comprising: receiving, in accordance with transmitting the message, a second message of the RACH procedure comprising a resource grant for one or more messages, wherein the resource grant is based at least in part on the CSI report.

Aspect 17: The method of any of aspects 1 through 16, further comprising: performing bistatic sensing based at least in part on receiving the FMCW-based LP-RS via the LP-WUR.

Aspect 18: The method of aspect 17, further comprising: transmitting a capability report indicating a capability of the UE to perform, using the LP-WUR, bistatic sensing associated with reception of FMCW-based LP-RSs, wherein performing the bistatic sensing is based at least in part on the capability.

Aspect 19: The method of any of aspects 1 through 18, wherein the baseband processing capability of the LP-WUR is a narrowband baseband processing capability.

Aspect 20: A method for wireless communications by a network entity, comprising: obtaining, from a UE, a capability report comprising an indication of a capability of a LP-WUR of the UE to perform FMCW-based wideband channel estimation; outputting, in accordance with the capability of the LP-WUR of the UE, a FMCW-based LP-RS; and obtaining, based at least in part on outputting the FMCW-based LP-RS, a CSI report comprising CSF.

Aspect 21: The method of aspect 20, further comprising: outputting a LP-WUS indicating for the UE to monitor for the FMCW-based LP-RS.

Aspect 22: The method of aspect 21, wherein the LP-WUS comprises an indication of a first resource allocation for the FMCW-based LP-RS, outputting the FMCW-based LP-RS is based at least in part on the first resource allocation.

Aspect 23: The method of aspect 22, further comprising: outputting a control signal that indicates a plurality of resource allocations including the first resource allocation for the FMCW-based LP-RS, wherein the indication comprises an index, from a plurality of indices corresponding to the plurality of resource allocations, corresponding to the first resource allocation of the plurality of resource allocations.

Aspect 24: The method of any of aspects 22 through 23, further comprising: outputting a control signal that indicates a plurality of resource allocation offsets between the first resource allocation for the FMCW-based LP-RS and a second resource allocation for the LP-WUS, wherein the indication comprises an index, from a plurality of indices corresponding to the plurality of resource allocation offsets, corresponding to a first resource allocation offset of the plurality of resource allocation offsets, wherein the first resource allocation is offset from the second resource allocation by the first resource allocation offset.

Aspect 25: The method of any of aspects 21 through 24, further comprising: outputting a control signal that indicates a resource allocation offset between a first resource allocation for the FMCW-based LP-RS and a second resource allocation for the LP-WUS, wherein outputting the FMCW-based LP-RS is based at least in part on the resource allocation offset.

Aspect 26: The method of aspect 20, wherein outputting the FMCW-based LP-RS comprises: outputting wake-up information via the FMCW-based LP-RS.

Aspect 27: The method of aspect 26, wherein the FMCW-based LP-RS indicates the wake-up information via a slope of the FMCW-based LP-RS, via an OCC associated with the FMCW-based LP-RS, via a cyclic shift associated with the FMCW-based LP-RS, via a triangular chirp associated with the FMCW-based LP-RS, or any combination thereof.

Aspect 28: The method of any of aspects 20 through 27, further comprising: outputting a control signal that indicates a shared resource allocation for first CSI reports associated with the LP-WUR and second CSI reports associated with a main radio of the UE.

Aspect 29: The method of any of aspects 20 through 28, further comprising: outputting a control signal that indicates a first resource allocation for first CSI reports associated with the LP-WUR and a second resource allocation for second CSI reports associated with a main radio of the UE.

Aspect 30: The method of any of aspects 20 through 29, wherein the capability report indicates one or more of a FMCW-based channel estimation bandwidth supported by the LP-WUR, a granularity of wideband channel estimation supported by the LP-WUR, a quantity of subbands for channel estimation supported by the LP-WUR, a timing gap between a reception time associated with the FMCW-based LP-RS and a transmission time associated with the CSI report, or any combination thereof.

Aspect 31: The method of any of aspects 20 through 30, further comprising: outputting a low-power signal indicating for the UE to transition from a RRC idle or inactive state to a RRC connected state, wherein the RRC idle or inactive state is a state in which the LP-WUR is powered on and a main radio of the UE is powered off.

Aspect 32: The method of any of aspects 20 through 31, wherein obtaining the CSI report comprises: obtaining the CSI report via a message of a RACH procedure.

Aspect 33: The method of aspect 32, wherein a RACH occasion associated with the RACH procedure is based at least in part on the CSI report being based at least in part on the FMCW-based LP-RS.

Aspect 34: The method of any of aspects 32 through 33, further comprising: outputting, in accordance with obtaining the message, a second message of the RACH procedure comprising a resource grant for one or more messages, wherein the resource grant is based at least in part on the CSI report.

Aspect 35: The method of any of aspects 20 through 34, further comprising: obtaining, via the capability report, an indication of a capability of the UE to perform, using the LP-WUR, bistatic sensing associated with reception of FMCW-based LP-RSs.

Aspect 36: The method of any of aspects 20 through 35, wherein a baseband processing capability of the LP-WUR is a narrowband baseband processing capability.

Aspect 37: A UE for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, or without pre-processing) to cause the UE to perform a method of any of aspects 1 through 19.

Aspect 38: A UE for wireless communications, comprising at least one means for performing a method of any of aspects 1 through 19.

Aspect 39: A non-transitory computer-readable medium storing code for wireless communications, the code comprising instructions executable by one or more processors (e.g., directly, indirectly, after pre-processing, or without pre-processing) to perform a method of any of aspects 1 through 19.

Aspect 40: A network entity for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, or without pre-processing) to cause the network entity to perform a method of any of aspects 20 through 36.

Aspect 41: A network entity for wireless communications, comprising at least one means for performing a method of any of aspects 20 through 36.

Aspect 42: A non-transitory computer-readable medium storing code for wireless communications, the code comprising instructions executable by one or more processors (e.g., directly, indirectly, after pre-processing, or without pre-processing) to perform a method of any of aspects 20 through 36.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive, at a low-power wake-up radio of the UE, a frequency modulated continuous wave-based low-power reference signal via a first bandwidth associated with a baseband processing capability of the low-power wake-up radio; and transmit, based at least in part on receiving the frequency modulated continuous wave-based low-power reference signal via the first bandwidth, a channel state information report comprising channel state feedback associated with a second bandwidth, wherein the second bandwidth comprises the first bandwidth.

2. The UE of claim 1, wherein the one or more processors are individually or collectively further operable to execute the code to cause the UE to:

receive, at the low-power wake-up radio, a low-power wake-up signal indicating for the UE to monitor for the frequency modulated continuous wave-based low-power reference signal.

3. The UE of claim 2, wherein, the low-power wake-up signal comprises an indication of a first resource allocation for the frequency modulated continuous wave-based low-power reference signal, and wherein receiving the frequency modulated continuous wave-based low-power reference signal is based at least in part on the first resource allocation.

4. The UE of claim 3, wherein the one or more processors are individually or collectively further operable to execute the code to cause the UE to:

receive a control signal that indicates a plurality of resource allocations including the first resource allocation for the frequency modulated continuous wave-based low-power reference signal, wherein the indication comprises an index, from a plurality of indices corresponding to the plurality of resource allocations, corresponding to the first resource allocation of the plurality of resource allocations.

5. The UE of claim 3, wherein the one or more processors are individually or collectively further operable to execute the code to cause the UE to:

receive a control signal that indicates a plurality of resource allocation offsets between the first resource allocation for the frequency modulated continuous wave-based low-power reference signal and a second resource allocation for the low-power wake-up signal, wherein the indication comprises an index, from a plurality of indices corresponding to the plurality of resource allocation offsets, corresponding to a first resource allocation offset of the plurality of resource allocation offsets, wherein the first resource allocation is offset from the second resource allocation by the first resource allocation offset.

6. The UE of claim 2, wherein the one or more processors are individually or collectively further operable to execute the code to cause the UE to:

receive a control signal that indicates a resource allocation offset between a first resource allocation for the frequency modulated continuous wave-based low-power reference signal and a second resource allocation for the low-power wake-up signal, wherein receiving the frequency modulated continuous wave-based low-power reference signal is based at least in part on the resource allocation offset.

7. The UE of claim 1, wherein, to receive the frequency modulated continuous wave-based low-power reference signal, the one or more processors are individually or collectively operable to execute the code to cause the UE to:

receive wake-up information via the frequency modulated continuous wave-based low-power reference signal, wherein the frequency modulated continuous wave-based low-power reference signal indicates the wake-up information via a slope of the frequency modulated continuous wave-based low-power reference signal, via an orthogonal cover code associated with the frequency modulated continuous wave-based low-power reference signal, via a cyclic shift associated with the frequency modulated continuous wave-based low-power reference signal, via a triangular chirp associated with the frequency modulated continuous wave-based low-power reference signal, or any combination thereof.

8. The UE of claim 1, wherein the one or more processors are individually or collectively further operable to execute the code to cause the UE to:

receive a control signal that indicates a shared resource allocation for first channel state information reports associated with the low-power wake-up radio and second channel state information reports associated with a main radio of the UE.

9. The UE of claim 1, wherein the one or more processors are individually or collectively further operable to execute the code to cause the UE to:

receive a control signal that indicates a first resource allocation for first channel state information reports associated with the low-power wake-up radio and a second resource allocation for second channel state information reports associated with a main radio of the UE.

10. The UE of claim 1, wherein the one or more processors are individually or collectively further operable to execute the code to cause the UE to:

transmit a capability report comprising an indication of a capability of the low-power wake-up radio to perform frequency modulated continuous wave-based wideband channel estimation, wherein the capability report indicates one or more of a frequency modulated continuous wave-based channel estimation bandwidth supported by the low-power wake-up radio, a granularity of wideband channel estimation supported by the low-power wake-up radio, a quantity of subbands for channel estimation supported by the low-power wake-up radio, a timing gap between a reception time associated with the frequency modulated continuous wave-based low-power reference signal and a transmission time associated with the channel state information report, or any combination thereof.

11. The UE of claim 1, wherein the one or more processors are individually or collectively further operable to execute the code to cause the UE to:

receive a low-power signal indicating for the UE to transition from a radio resource control idle or inactive state to a radio resource control connected state, wherein the radio resource control idle or inactive state is a state in which the low-power wake-up radio is powered on and a main radio of the UE is powered off.

12. The UE of claim 1, wherein, to transmit the channel state information report, the one or more processors are individually or collectively operable to execute the code to cause the UE to:

transmit the channel state information report via a message of a random access channel procedure.

13. The UE of claim 12, wherein the one or more processors are individually or collectively further operable to execute the code to cause the UE to:

select a random access channel occasion associated with the random access channel procedure based at least in part on the channel state information report being based at least in part on the frequency modulated continuous wave-based low-power reference signal.

14. The UE of claim 12, wherein the one or more processors are individually or collectively further operable to execute the code to cause the UE to:

receive, in accordance with transmitting the message, a second message of the random access channel procedure comprising a resource grant for one or more messages, wherein the resource grant is based at least in part on the channel state information report.

15. The UE of claim 1, wherein the one or more processors are individually or collectively further operable to execute the code to cause the UE to:

transmit a capability report indicating a capability of the UE to perform, using the low-power wake-up radio, bistatic sensing associated with reception of frequency modulated continuous wave-based low-power reference signals; and perform bistatic sensing based at least in part on the capability and on receiving the frequency modulated continuous wave-based low-power reference signal via the low-power wake-up radio.

16. The UE of claim 1, wherein the baseband processing capability of the low-power wake-up radio is a narrowband baseband processing capability.

17. A network entity, comprising:

one or more memories storing processor-executable code; and one or more processors coupled with the one or more memories and individually or collectively operable to execute the code to cause the network entity to:

obtain, from a user equipment (UE), a capability report comprising an indication of a capability of a low-power wake-up radio of the UE to perform frequency modulated continuous wave-based wideband channel estimation;

output, in accordance with the capability of the low-power wake-up radio of the UE, a frequency modulated continuous wave-based low-power reference signal; and obtain, based at least in part on outputting the frequency modulated continuous wave-based low-power reference signal, a channel state information report comprising channel state feedback.

18. The network entity of claim 17, wherein the one or more processors are individually or collectively further operable to execute the code to cause the network entity to:

output a low-power wake-up signal indicating for the UE to monitor for the frequency modulated continuous wave-based low-power reference signal.

19. The network entity of claim 18, wherein the low-power wake-up signal comprises an indication of a first resource allocation for the frequency modulated continuous wave-based low-power reference signal, and wherein outputting the frequency modulated continuous wave-based low-power reference signal is based at least in part on the first resource allocation.

20. The network entity of claim 19, wherein the one or more processors are individually or collectively further operable to execute the code to cause the network entity to:

output a control signal that indicates a plurality of resource allocations including the first resource allocation for the frequency modulated continuous wave-based low-power reference signal, wherein the indication comprises an index, from a plurality of indices corresponding to the plurality of resource allocations, corresponding to the first resource allocation of the plurality of resource allocations.

21. The network entity of claim 19, wherein the one or more processors are individually or collectively further operable to execute the code to cause the network entity to:

output a control signal that indicates a plurality of resource allocation offsets between the first resource allocation for the frequency modulated continuous wave-based low-power reference signal and a second resource allocation for the low-power wake-up signal, wherein the indication comprises an index, from a plurality of indices corresponding to the plurality of resource allocation offsets, corresponding to a first resource allocation offset of the plurality of resource allocation offsets, wherein the first resource allocation is offset from the second resource allocation by the first resource allocation offset.

22. The network entity of claim 18, wherein the one or more processors are individually or collectively further operable to execute the code to cause the network entity to:

output a control signal that indicates a resource allocation offset between a first resource allocation for the frequency modulated continuous wave-based low-power reference signal and a second resource allocation for the low-power wake-up signal, wherein outputting the frequency modulated continuous wave-based low-power reference signal is based at least in part on the resource allocation offset.

23. The network entity of claim 17, wherein, to output the frequency modulated continuous wave-based low-power reference signal, the one or more processors are individually or collectively operable to execute the code to cause the network entity to:

output wake-up information via the frequency modulated continuous wave-based low-power reference signal, wherein the frequency modulated continuous wave-based low-power reference signal indicates the wake-up information via a slope of the frequency modulated continuous wave-based low-power reference signal, via an orthogonal cover code associated with the frequency modulated continuous wave-based low-power reference signal, via a cyclic shift associated with the frequency modulated continuous wave-based low-power reference signal, via a triangular chirp associated with the frequency modulated continuous wave-based low-power reference signal, or any combination thereof.

24. The network entity of claim 17, wherein the one or more processors are individually or collectively further operable to execute the code to cause the network entity to:

output a control signal that indicates a shared resource allocation for first channel state information reports associated with the low-power wake-up radio and second channel state information reports associated with a main radio of the UE.

25. The network entity of claim 17, wherein the one or more processors are individually or collectively further operable to execute the code to cause the network entity to:

output a control signal that indicates a first resource allocation for first channel state information reports associated with the low-power wake-up radio and a second resource allocation for second channel state information reports associated with a main radio of the UE.

26. The network entity of claim 17, wherein the capability report indicates one or more of a frequency modulated continuous wave-based channel estimation bandwidth supported by the low-power wake-up radio, a granularity of wideband channel estimation supported by the low-power wake-up radio, a quantity of subbands for channel estimation supported by the low-power wake-up radio, a timing gap between a reception time associated with the frequency modulated continuous wave-based low-power reference signal and a transmission time associated with the channel state information report, or any combination thereof.

27. The network entity of claim 17, wherein the one or more processors are individually or collectively further operable to execute the code to cause the network entity to:

output a low-power signal indicating for the UE to transition from a radio resource control idle or inactive state to a radio resource control connected state, wherein the radio resource control idle or inactive state is a state in which the low-power wake-up radio is powered on and a main radio of the UE is powered off.

28. The network entity of claim 17, wherein, to obtain the channel state information report, the one or more processors are individually or collectively operable to execute the code to cause the network entity to:

obtain the channel state information report via a message of a random access channel procedure, wherein a random access channel occasion associated with the random access channel procedure is based at least in part on the channel state information report being based at least in part on the frequency modulated continuous wave-based low-power reference signal; and output, in accordance with obtaining the message, a second message of the random access channel procedure comprising a resource grant for one or more messages, wherein the resource grant is based at least in part on the channel state information report.

29. A method for wireless communications by a user equipment (UE), comprising:

receiving, at a low-power wake-up radio of the UE, a frequency modulated continuous wave-based low-power reference signal via a first bandwidth associated with a baseband processing capability of the low-power wake-up radio; and transmitting, based at least in part on receiving the frequency modulated continuous wave-based low-power reference signal via the first bandwidth, a channel state information report comprising channel state feedback associated with a second bandwidth, wherein the second bandwidth comprises the first bandwidth.

30. A method for wireless communications by a network entity, comprising:

obtaining, from a user equipment (UE), a capability report comprising an indication of a capability of a low-power wake-up radio of the UE to perform frequency modulated continuous wave-based wideband channel estimation;

outputting, in accordance with the capability of the low-power wake-up radio of the UE, a frequency modulated continuous wave-based low-power reference signal; and obtaining, based at least in part on outputting the frequency modulated continuous wave-based low-power reference signal, a channel state information report comprising channel state feedback.

* * * * *